US012733583B2

(12) United States Patent
Heims et al.

(10) Patent No.: US 12,733,583 B2
(45) Date of Patent: Sep. 15, 2026

(54) SYSTEMS AND METHODS FOR RESOLVING HEADER SLIP AND STALL EVENTS

(71) Applicant: Deere & Company, Moline, IL (US)

(72) Inventors: Troy M. Heims, Davenport, IA (US); Alex Brimeyer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 222 days.

(21) Appl. No.: 18/634,089

(22) Filed: Apr. 12, 2024

(65) Prior Publication Data

US 2025/0318466 A1 Oct. 16, 2025

(51) Int. Cl.

*A01D 41/14* (2006.01)
*A01D 41/127* (2006.01)
*A01D 45/02* (2006.01)
*A01D 57/02* (2006.01)
*A01D 57/20* (2006.01)

(52) U.S. Cl.

CPC ....... *A01D 41/141* (2013.01); *A01D 41/1274* (2013.01); *A01D 41/142* (2013.01); *A01D 45/023* (2013.01); *A01D 45/025* (2013.01); *A01D 57/02* (2013.01); *A01D 57/20* (2013.01)

(58) Field of Classification Search

CPC .. A01D 41/1274; A01D 41/14; A01D 41/141; A01D 41/142; A01D 45/023; A01D 45/025; A01D 57/02; A01D 57/20

See application file for complete search history.

(56) References Cited

U.S. PATENT DOCUMENTS

| | | | | |
|---|---|---|---|---|
| 6,843,044 | B2 | 1/2005 | Clauss | |
| 7,739,861 | B2 | 6/2010 | Mackin | |
| 9,320,198 | B2 * | 4/2016 | Trowbridge | A01D 75/182 |
| 10,028,436 | B2 * | 7/2018 | Ricketts | A01D 45/023 |
| 10,064,332 | B1 * | 9/2018 | Ohms | A01D 45/021 |
| 2017/0280624 | A1 | 10/2017 | Straeter | |
| 2022/0071093 | A1 | 3/2022 | Risius | |

* cited by examiner

*Primary Examiner* — Andrew Joseph Rudy

(74) *Attorney, Agent, or Firm* — Taft Stettinius & Hollister LLP; Stephen F. Rost

(57) ABSTRACT

Upon detection of a header slip or stall event involving one or more driven bodies of a header of a combine harvester, the header can be moved out of the crop material, and a drive system is disengaged. An auxiliary action can automatically displace a component(s) of the header to a location that can assist with clearing a blockage from the header. A driver of the drive system is automatically operated in reverse to displace the driven body(ies) in a direction that can move the blockage out of the header. The drive system can then automatically reengage, and, in connection with determining if the blockage has been cleared from the header, the driven bodies can again be driven in a direction associated with harvesting crop material. If the blockage is not cleared, a determination can be made as to whether an attempt can again be made to clear the blockage.

20 Claims, 18 Drawing Sheets

SYSTEMS AND METHODS FOR RESOLVING HEADER SLIP AND STALL EVENTS

FIELD OF THE DISCLOSURE

The present disclosure generally relates to clearing blockages from headers of combine harvesters, and, more specifically, to resolution of header slip and stall events.

BACKGROUND

Agricultural harvesters, such as, for example, combine harvesters, can include different portions or sections for cutting and processing crops. For example, certain types of combines include a header in the form of a corn header that has a number of crop dividers, each crop divider defining a channel to direct stalks of a crop material, namely corn, to a row unit of the header. The row units can include gathering chains, deck plates, and stalk rolls, and can be configured to at least separate corn ears from the stalk. The separated corn ears can be supported by the deck plates that are separated from each other by an adjustable channel. Further, with corn headers, the corn ears can be moved by the gathering chain to a floor of the corn header, where an auger located above the floor can move the corn ears to a location for collection. Another type of header for combine harvesters are draper headers, which can include a reel that transports cut crop material that is cut by a cut bar of the draper header to a plurality of draper belts of the draper header. The draper belts can then transport the crop material laterally inwardly and rearwardly to a feederhouse of the harvester for processing by the harvester.

SUMMARY

The present disclosure may include one or more of the following features and combinations thereof.

In one embodiment of the present disclosure, a system is provided for resolving a header slip or stall event for a header of a combine harvester. The system can include a driver, a sensor, and a driven body that can be positioned about the header at a location to engage a crop material. The driven body can be coupled to the driver such that an operation of the driver can facilitate selective displacement of the driven body relative to the header. The system can also include a memory device coupled with at least one processor. The memory device can include instructions that when executed by the at least one processor cause the at least one processor to determine, from at least information provided by the sensor, an occurrence of the header slip or stall event that prevents a displacement of a driven body in a first direction. Further, the memory device can also include instructions that when executed by the at least one processor cause the at least one processor to generate an auxiliary action signal to perform an auxiliary action associated with a displacement of at least one component of the header from a harvest position. Additionally, the memory device can also include instructions that when executed by the at least one processor cause the at least one processor to generate, after performance of the auxiliary action, a first driver signal to operate the driver to facilitate a displacement of the driven body in either the first direction or a second direction, the second direction being opposite to the first direction. The memory device can also include instructions that when executed by the at least one processor cause the at least one processor to determine, after generation of the first driver signal, whether a blockage is disengaged from the header, and generate, in response to the determination that the blockage is disengaged from the header, a component signal to facilitate a displacement of the at least one component of the header back to the harvest position.

In one embodiment of the present disclosure, a method is provided for resolving a header slip or stall event for a header of a combine harvester. The method can include determining, from at least information provided by a sensor, an occurrence of the header slip or stall event that prevents a displacement of a driven body in a first direction. The driven body can be selectively displaceable in the first direction or a second direction by a power transmitted from a driver. Further, the driven body can be positioned about the header at a location to engage a crop material. Additionally, an auxiliary action signal can be generated to perform an auxiliary action associated with a displacement of at least one component of the header from a harvest position to at least assist with a disengagement of a blockage from the header. The method can also include generating, after the performance of the auxiliary action, a first driver signal to operate the driver to facilitate a displacement of the driven body in either the first direction or the second direction, the second direction being opposite to the first direction. The method can further include determining, after at least the generating the first driver signal, whether the blockage is disengaged from the header, and generating, in response to determining the blockage is disengaged from the header, a component signal to facilitate a displacement of the at least one component of the header back to the harvest position.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 illustrates a side view of a second combine harvester having an exemplary header in the form of a draper belt header.

Corresponding reference numerals are used to indicate corresponding parts throughout the several views.

DETAILED DESCRIPTION

Figure 1:
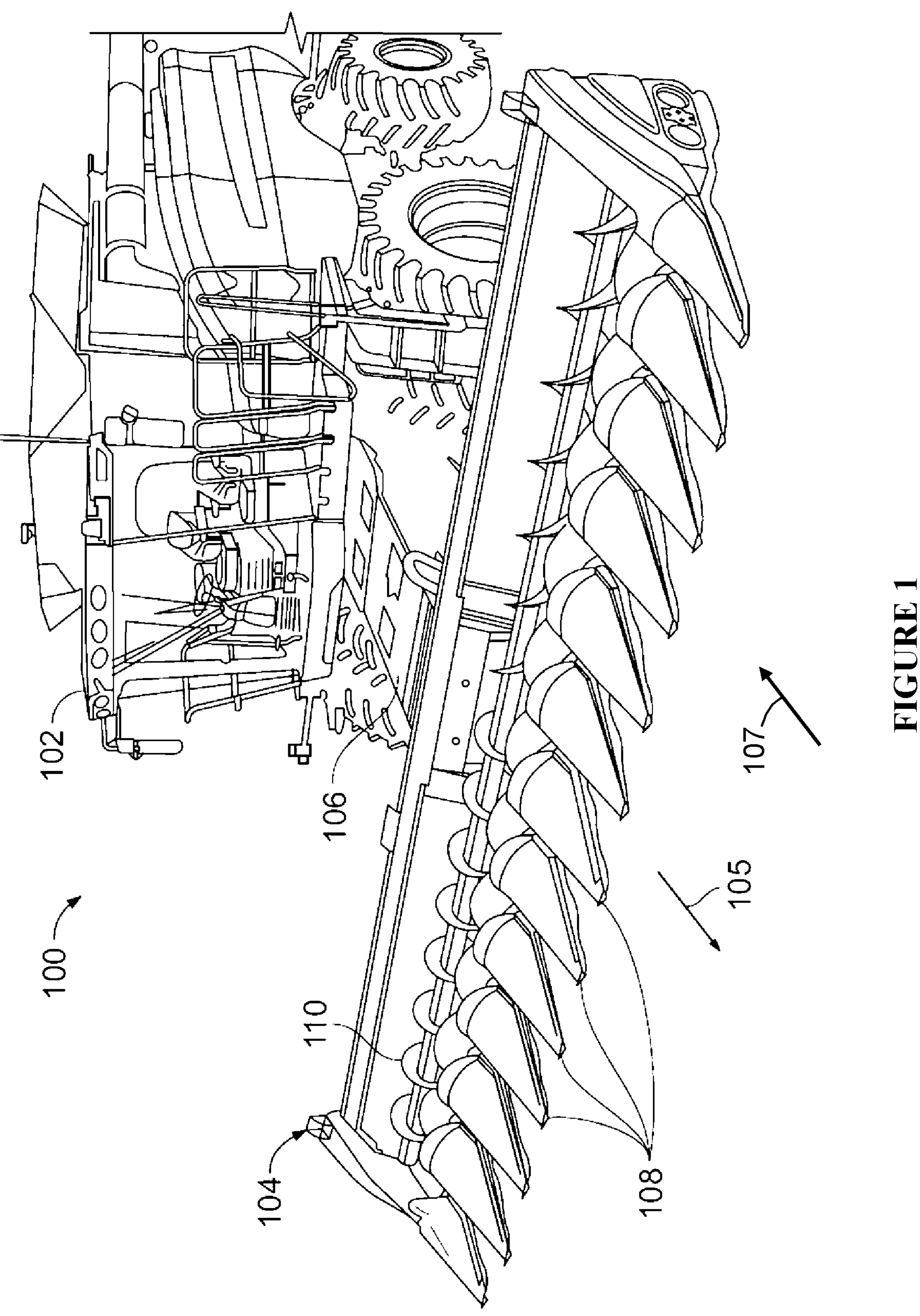
FIG. 1 illustrates a front side perspective view of a first combine harvester having an exemplary header in the form of a corn header.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such feature is required in all embodiments and, in some embodiments, may not be included or may be combined with other features.

Figure 5:
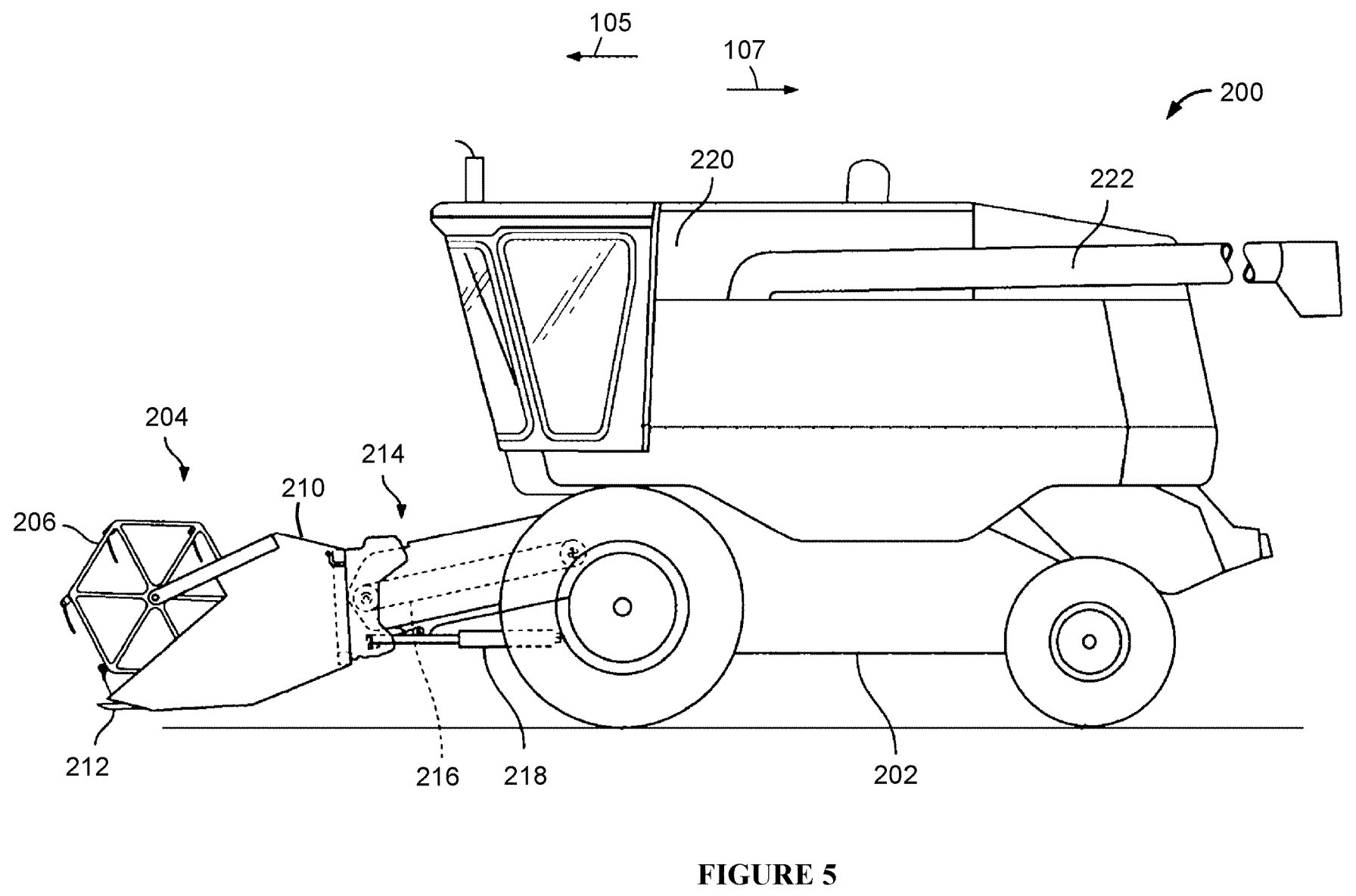

FIG. 1 illustrates a front side perspective view of one example of a combine harvester 100, also referred to as a harvester or harvesting machine. The illustrated harvester 100 includes an operator cab 102 and a non-limiting example of a particular type of header 104 is affixed thereto. Moreover, in the exemplary embodiment depicted in FIG. 1, the header 104 is a corn header. However, as discussed herein, embodiments of the subject disclosure are applicable to various different types of headers 104, including, but not limited to, corn headers and draper belt headers 204 (FIG. 5). Thus, while, for at least purposes of illustration, embodiments discussed herein may reference a particular type of header, as well as a particular type of crop material, such as, for example, corn, it is understood that the combine harvester 100 and associated header 104 can be configured to harvest variety of other crop materials, including, but not limited to, sunflower, wheat, soy, and granola, among other types of crop material.

The combine harvester 100 can travel in a generally forward direction of travel, as indicated by the arrow 105 in FIG. 1. As the combine harvester 100 moves forward, the exemplary header 104 can engage crop material, which, in this example, is corn crops, and separate the ears of corn from the associated stalks. The separated ears can then be feed through a feederhouse 106 back to other crop processing functionality in the combine harvester 100. The header 104 illustratively includes a plurality of row units 108 that travel between the rows of the crop material, or corn rows, and help to divide the corn rows from one another. According to certain embodiments, stalks can travel rearwardly between the row units 108, where the stalks are engaged by gathering chains 112 (FIGS. 2 and 3) and by a mechanism, such as, for example, a snapping roller, that separates the ears of corn from the cornstalks. The ears can then be fed backward toward an auger 110 that moves the separated ears of corn to a central area of header 104 where the ears can be fed into the feederhouse 106.

For certain types of headers 104, a drive system can be utilized to provide rotational power for movement of certain components of the header 104 or row units 108. The drive system can include a driver, such as, for example, an actuator, engine, or motor, including an electric motor, actuator, or hydraulic motor, as well as any associated hydraulic pump, among others, and a drive shaft that transmits power generated by operation of the driver. Further, in certain instances, the driver can be a common driver such that the drive shaft is coupled to a plurality of components of the header 104 for either or both direct and indirect transmission of power from the driver. The driver can also be operated in a first, or forward direction, and a second, reverse direction, the second, or reverse, direction being opposite of the first direction. According to certain embodiments, while the combine harvester 100 is being operated in a manner that at least collects crop material for delivery of the crop material to the feederhouse 106, the driver can be operated in the first, or forward direction.

Figure 2:
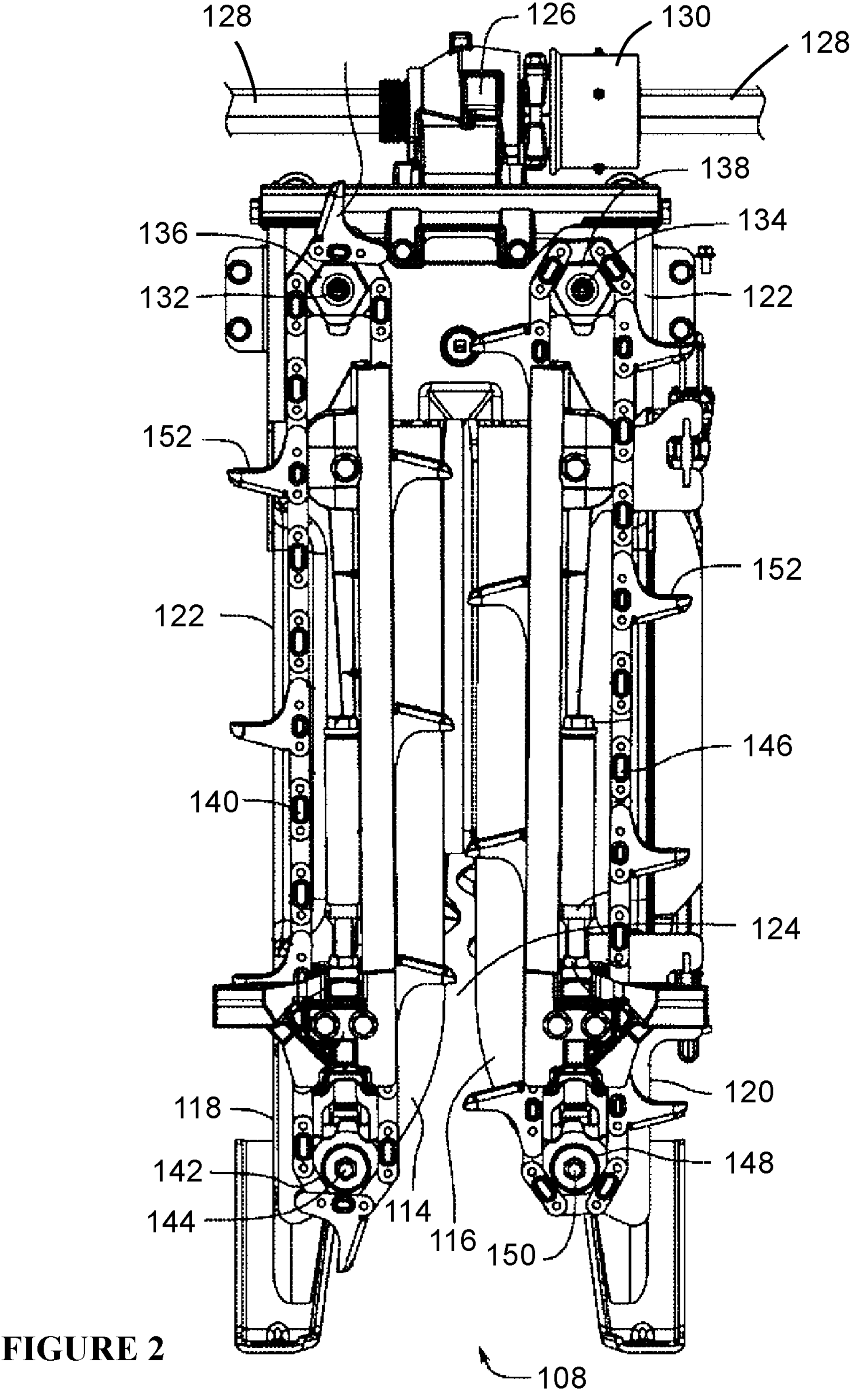
FIGS. 2 and 3 illustrate top and bottom views, respectively, of an exemplary row unit of the corn header shown in FIG. 1.
Figure 3:
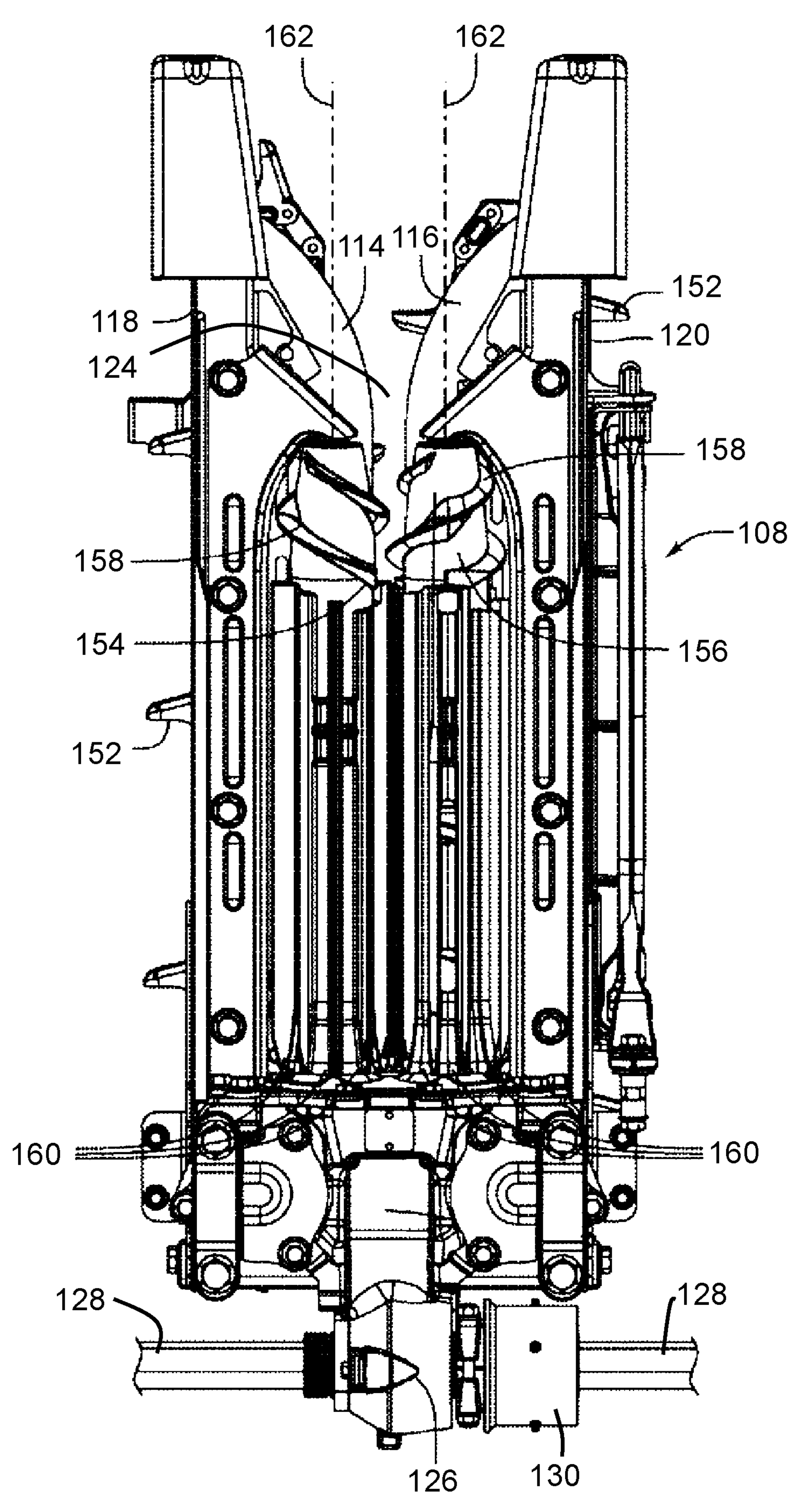

FIGS. 2 and 3 illustrate top and bottom views, respectively, of an exemplary row unit 108 of the header 104 shown in FIG. 1. As seen, opposing right and left deck plates 114, 116 can be respectively secured to legs 118, 120 of a frame 122 of the row unit 108. The deck plates 114, 116 can have generally parallel opposing inner edges spaced apart from each other so as to define a channel 124 therebetween that is adapted for receiving stalks of an aligned corn row as the row unit 108 proceeds along the corn row. The position of one or both of the deck plates 114, 116 can be adjusted so as adjust the width of the channel 124 therebetween. According to certain embodiments, such adjustment of the width of the channel 124 can be attained by selective operation of an actuator, such as, for example, a motor or hydraulically actuated cylinder, among other actuators, that, when operated, linearly adjusts the position of at least one deck plate 114, 116 so as to adjust the width of the channel 124.

The gathering chains 112 can be disposed between adjacent row units 108. Further, the gathering chains 112 can be driven in a first, or forward, direction at least in the area between adjacent dividers of the row units 108 so that the gathering chains 112 can assist with stalks traveling in a rearward direction of travel 107. By traveling in the first, or forward, direction, the gathering chains 112 can assist in preventing or minimizing separated ears from falling onto the ground.

A gear assembly 126 of the row unit 108 can be coupled to a pair of drive shafts 132, 134, each drive shaft 132, 134 being coupled to a drive sprocket 136, 138. A first gathering chain 140 can be looped around a drive sprocket 136 and an idler sprocket 142 that is mounted to an idler shaft 144, and a second gathering chain 146 can be looped around the other drive sprocket 138 and another idler sprocket 148 that is mounted to an idler shaft 150. Each gathering chain 140, 146 can include a plurality of outwardly extending lugs 152. Power can be transferred from the drive system can be transmitted to rotate the drive shafts 132, 134, and thus the associated drive sprockets 136, 138, in a manner that powers rotational displacement of the gathering chains 140, 146 about the drive sprockets 136, 138 and idler sprockets 142, 148. As the gathering chains 140, 146 are rotated in a first, or forward, direction of the gathering chains 140, lugs 152 can enter, and pass along, the region adjacent to the channel 124, if not into the channel 124, such that the lugs 152 can engage stalks of the crop material.

As seen in a least FIG. 3, the row unit 108 can further include stalk rolls 154, 156 that are mounted to drive shafts that are directly or indirectly coupled to the drive system. Thus, power transmitted from the drive system can power rotational displacement of the stalk rolls 154, 156 in a corresponding first, or forward, direction of rotation for each of the stalk rolls 1546, 156. The stalk rolls 154, 156 can be located beneath the deck plates 114, 116, and can have auger flights 109 that are configured to, as the stalk rolls 154,156 are rotated in the first, or forward, direction by drive system draw stalks into the channel 124. Moreover, the stalk rolls 154, 156 can have blades configured to, as the stalk rolls 154, 156 rotate around a corresponding axis of rotation 162, draw the crop material through the channel 124 defined by the deck plates 114, 116. Further, as one stalk roll 106 rotates in a clockwise direction, the other stalk roll 108 rotates in an opposing, counterclockwise direction so as to further assist in pulling the crop material into the header 104. Thus, a first, or forward, direction of rotation for one stalk roll 154 can be different than the first, or forward, direction of rotation of the other stalk roll 156.

In the illustrated example in which the crop material is corn, the deck plates 114, 116 can be configured to cause at least the ears of corn, which are too large to pass downwardly through the channel 124, to become detached from the stalks. The lugs 82 of the powered, rotating gathering chains 140, 146 to move the detached ears from the deck plates 114, 116 to the auger 110. The powered, rotating auger 110 can then move the ears from the auger 110 to the feederhouse 106. The feederhouse 106 can move the ears out of the header 104 and into the body of the combine harvester 100 for processing.

Figure 4:
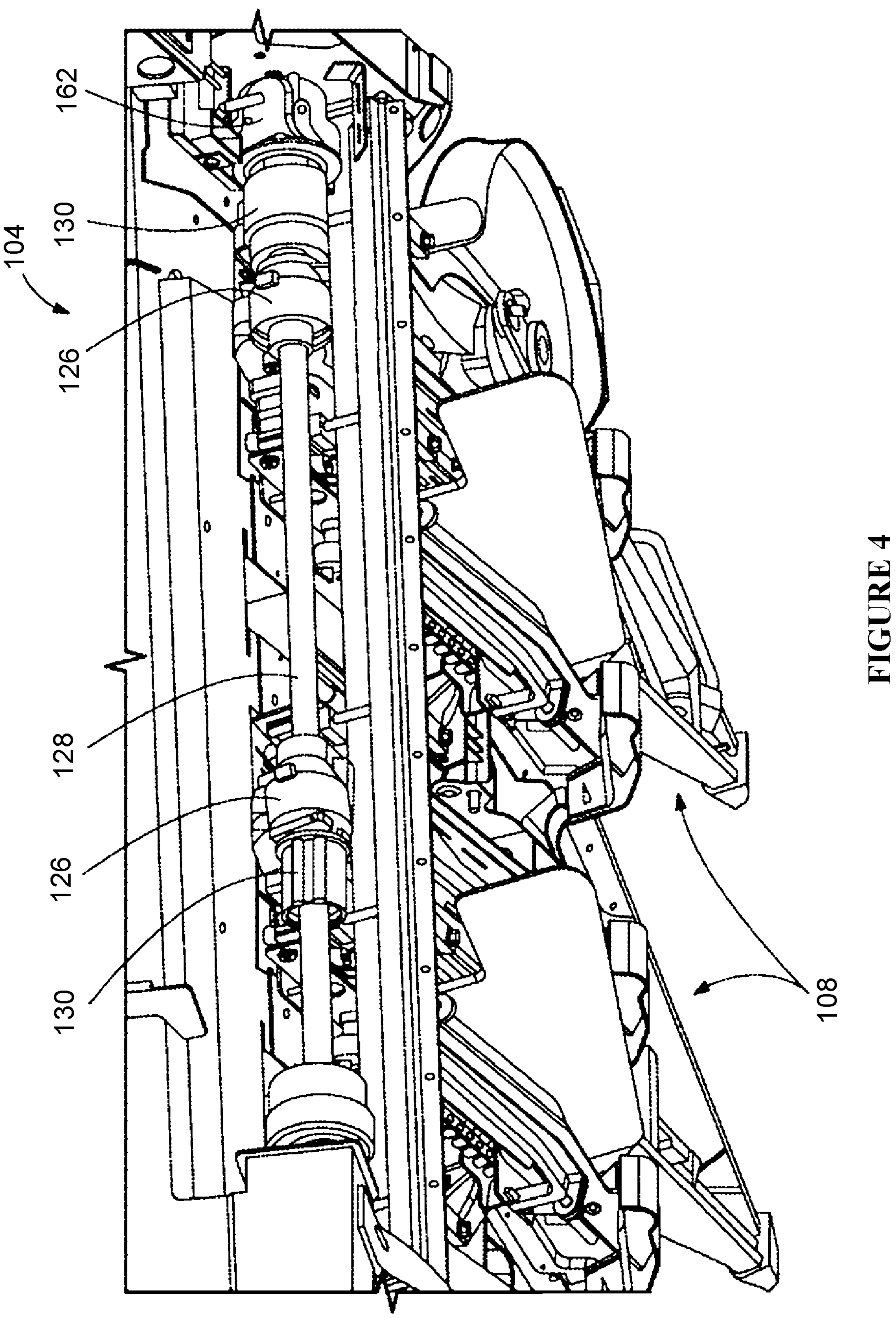
FIG. 4 illustrates a rear perspective view of a portion of the exemplary header shown in FIG. 1.

FIG. 4 illustrates a rear perspective view of a portion of the header 104 of FIG. 1 in which the header 104 includes a drive shaft 128 and at least one slip clutch 130. As illustrated, the drive shaft 128 of the drive system operatively couples the driver, such as, for example, the engine of the combine harvester 100, to the row units 108. In the illustrated example, a gear assembly 126 can be utilized for each row unit 108 for the transfer of power to one or more components of that row unit 108, including, for example, for rotational displacement of the gathering chains 140, 146 and the stalk rolls 154, 156. The drive system for the header 104 can also include one or more other gear assemblies 162, including, for example, a gear assembly 162 for each of a plurality of choppers of the header 104. Moreover, the drive system can include, for each chopper, a corresponding gear assembly 162 that is used transfer power from the drive shaft 108 to a chopper that is configured for chopping the crop material, such as, for example, corn stalks. Further, each of the gear assemblies 126, 162 can be coupled to, and driven by, a slip clutch 130.

In certain instances, however, a blockage, including a plug, can form that can interfere with the rotational displacement of the gathering chains 112, 140, 146 (collectively referred to as gathering chains 112), stalk rolls 154, 156, or choppers, as well as combinations thereof. For example, in certain instances, the speed at which the combine harvester 100 is traveling or the amount of crop material within the channel, or a combination of both, can be at a generally high level such that crop material in the channel 124, or otherwise engaged by or between the gathering chains 140, 146 or the stalk rolls 154, 156, can result in the formation of a blockage. Such blockages can also be formed in the header 104 or row units 108 a variety of other manners, including, but not limited to, debris, such as, for example, branches, fences, or rocks, among other debris.

A blockage can therefore provide an obstacle or resistance against the rotational displacement of certain components of the header 104 that are driven by power provided by the driver. Accordingly, as the driver continues to provide rotational power through the drive shaft 128, such resistance against the rotational displacement of components of the header 104 can potentially expose those components, or the associated components involved in the transmission of the rotational power to those components, to excessive, and potentially damaging, levels of torque. To minimize such potential damage, the drive system can include one or more torque limiting devices, such as, for example, one or more slip clutches 130. The slip clutches 130 can be directly or indirectly coupled to the drive shaft 128, and, moreover, between the drive shaft 128 and other components of the header 104. Thus, during generally normal operating conditions, rotational power being provided by the driver through the drive shaft 128 can be transferred to other components of the header 104 through a slip clutch 130.

Regardless of whether using the header is a corn header 104 or a draper header 204 (FIG. 5), among other types of headers to move crop material, in at least certain situations, crop material, among other debris, can form blockages, also referred to as plugs, along the header 104, 204. Such blockages can interfere with, including prevent or trigger a corresponding stoppage of movement and associated operation of at least certain components of the header 104, 204. Thus, such blockages can result in crop material not flowing along at least a portion of the header 104, 204, thereby causing potentially costly damage to the header and stoppages in the operation of the combine harvester 100.

With respect to the header 104 illustrated in at least FIG. 4, in the event, a component of the header 104 experiences a blockage that impedes the rotational movement of the component, the torque levels being experienced by the associate transmission components, including the slip clutch 130, can increase. The slip clutch 130 can thus be configured such that when the torque levels reach a certain level, the slip clutch 130 is triggered such that a component of the slip clutch 130 slips or spins free in a manner that stops the transfer of power from the drive shaft 128 to components of the header 104 that are coupled to the slip clutch 130. Accordingly, in such an event, the triggering of the slip clutch 130 can protect components of the header 104 that are coupled thereto from damage associated with being exposed to excessive torques.

FIG. 5 illustrates a side view of a second combine harvester 200 having another exemplary header 204 in the form of a draper belt header. Similar to the combine harvester 100 shown at least FIG. 1, the combine harvester 200 can also be similarly movable in both forward direction and rearward direction, as indicated by arrows 105, 107, respectively, shown in FIG. 1. In the illustrated embodiment, the header 204 is coupled to a chassis 202 and positioned to remove crop material from the ground in use of the combine harvester 200. The header 204 includes a reel 206 to draw crop material into the header 204, and which can be selectively movable relative to a frame or bearing frame 210 of the header 204 in use of the combine harvester 200. The header 204 can also include a cutter bar 212 that is adapted to cut crop material. Additionally, the header 204 is configured to direct cut crop material to a feederhouse 214.

The feederhouse 214 includes a conveyor 216 and is pivotable by an actuator 218 relative to the chassis 202 about an axis which extends horizontally and transversely to the forward direction indicated by arrow 105. In some embodiments, the axis may coincide with a rotational axis of an upper guide roller of the conveyor 216 in order to be able to modify the height of the header 204 above the ground. The harvester 100 can also be configured to be displaced in a rearward direction, as indicated by arrow 107, so as to be selectively movable from a header harvest position at which the header is positioned to harvest, or engage, crop in the field, to another position at which the header is out of, away from, or otherwise disengaged with the crop material in the field that is to be harvested.

Although not shown in FIG. 5, it should be appreciated that the combine harvester 200 at least partially houses a number of devices or systems in an interior thereof, such as one or more threshing device(s), separating device(s), and cleaning device(s), for example. Further, the combine harvester 200 at least partially defines a tank 220 that may be used to store cleaned crop materials (e.g., grain) prior to removal and unloading onto a transport vehicle by an unloading conveyor 222.

Figure 6:
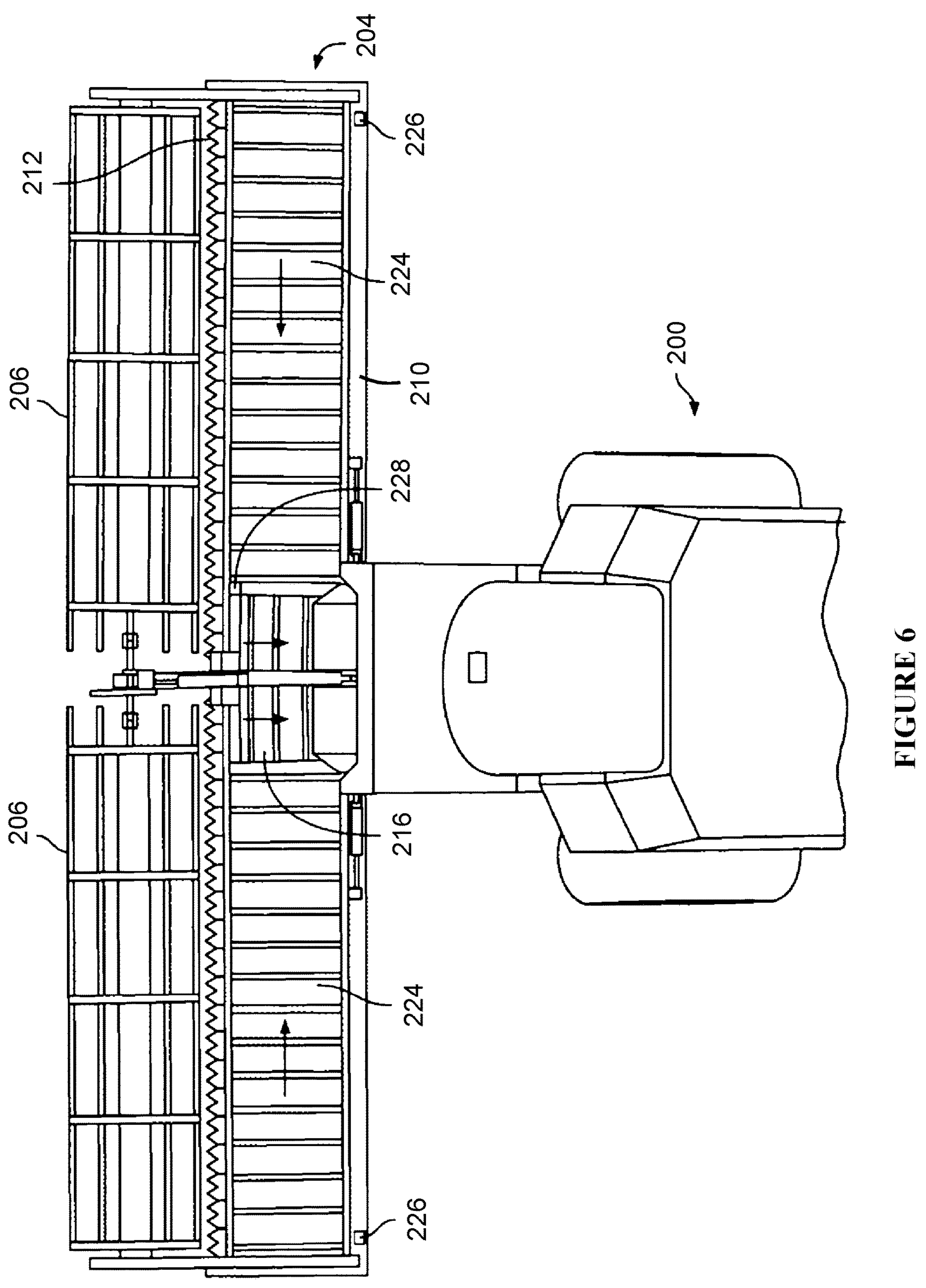
FIG. 6 illustrates a top view of a front portion of the second combine harvester shown in FIG. 5.

The header 204 can include one or more conveyors to convey crop material, and, more particularly cut crop material, along the header 204. For example, the exemplary header 204 shown in at least FIG. 6 includes two side belts 224 that are each connected to a driver 226 that provides power for the rotational displacement of the side belts 224. Accordingly, during harvesting of crop material, the power provide by the driver 226 can be transmitted to the each of the two side belts 224 such that the top sides of the side belts 224 move inwardly (i.e., as shown by the arrows) so as to convey crop material captured by the reel 206 and severed by the cutter bar 212 to the center of the header 204. Crop material conveyed to the center of the header 204 is then conveyed on a belt of a central belt conveyor 216 that is driven by a driver 226 and transported rearwardly into the feederhouse 214.

Figure 7:
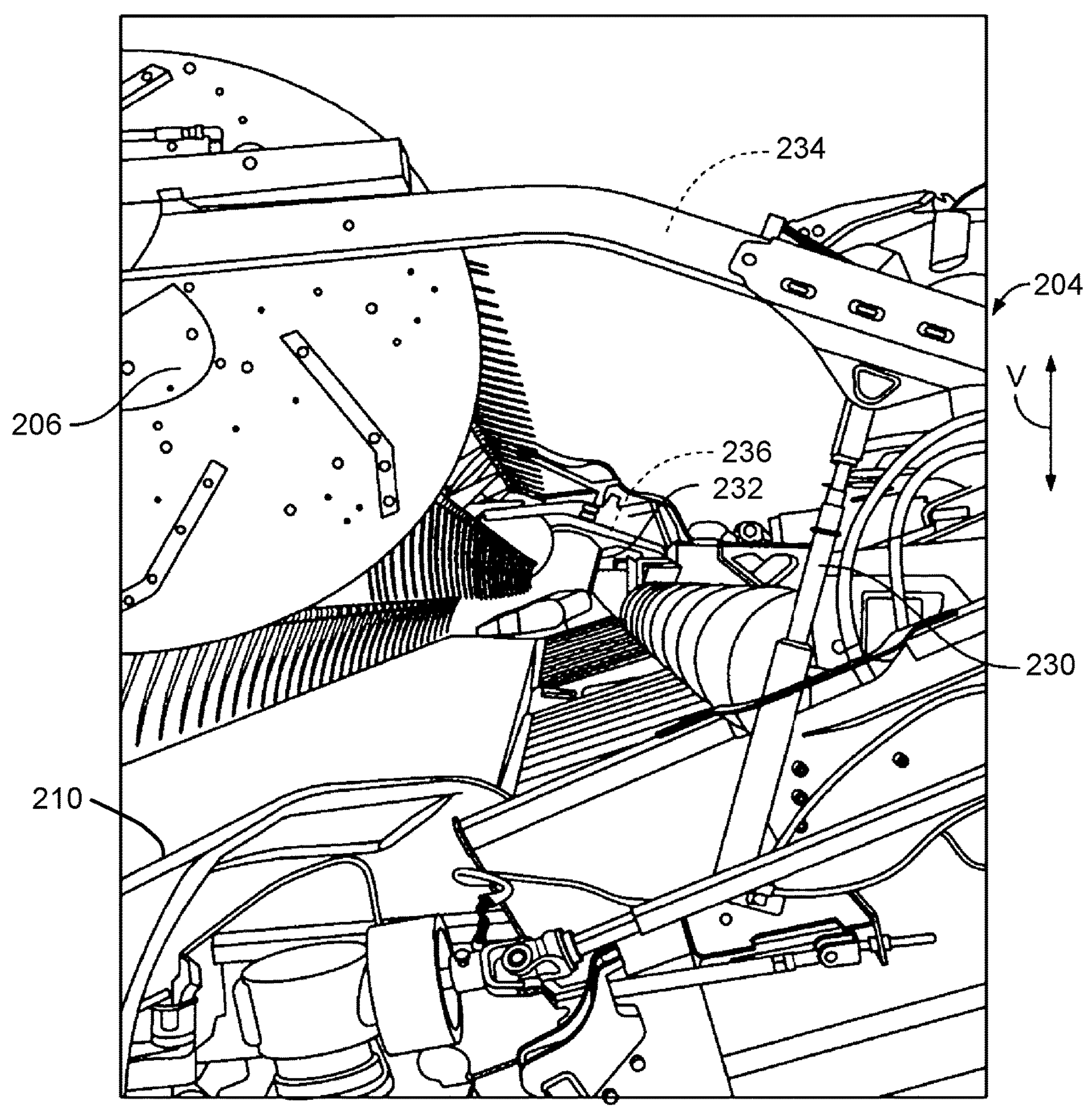
FIG. 7 illustrates a side elevation view of a plurality of actuators of the exemplary draper belt header shown in FIG. 5.

Referencing FIG. 7, according to the exemplary illustrated embodiment of the header 204, the reel 206 can be displaced relative to a frame 210 of the header 204 via operation of one or more actuators 230, 232, 234, 236. A variety of different types of devices, as well as combinations of devices, can be utilized for the actuators 230, 232, 234, 236, including, for example, electrically-driven linear actuators, a pneumatic actuators, or another hydraulically-operated actuators, as well as combinations thereof, among other devices. Thus, for example, one or more of the actuators 230, 232, 234, 236 can be a double-acting hydraulic or pneumatic cylinder that is extendable and retractable to vary a length thereof. Such actuators 230, 232, 234, 236 can thus further include one or more associated pumps, motors, or control valves, as well as various combinations thereof, among other devices, that are utilized in controlling the selective extension and retraction of such cylinders 230, 232, 234, 236. Additionally, while the embodiment depicted in FIG. 7 illustrates four actuators 230, 232, 234, 236, the number of actuators can vary.

Figure 8A:
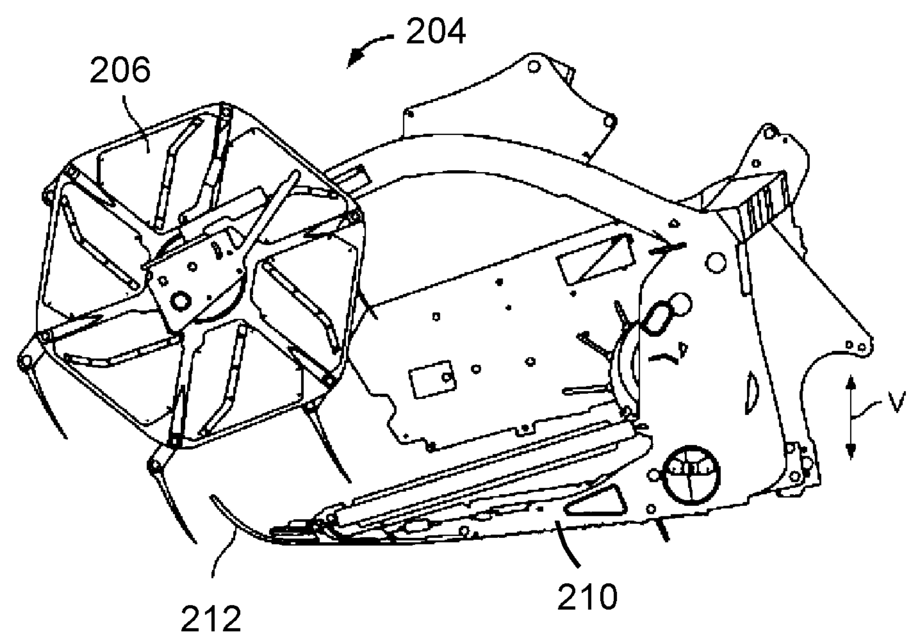
FIGS. 8A, 8B, 8C, and 8D illustrate sectional views of the exemplary draper belt header shown in FIG. 5 with a reel in a harvest position, raised position, rearward position, and lowered position, respectively.

In the illustrated embodiments, the one or more of the actuators 230, 232, can be selectively actuated so as to be extendable and retractable in a manner that can cooperatively vertically displace (as generally indicated in at least FIG. 7 as by the arrow labeled "V") the reel 206 upwardly and downwardly relative to the frame 210. Additionally, at least some of the actuators 234, 236 can be extendable and retractable to move the reel 206 in a generally forward and rearward directions so as to adjust the fore position or aft position of the reel 206. For example, FIG. 8A illustrates the reel 206 positioned in relatively close proximity to the cutter bar 212 and the ground. Thus, in such an exemplary harvest position, the reel 206 is positioned to draw crop material severed from the ground by the cutter bar 212 into the header 204.

Figure 9:
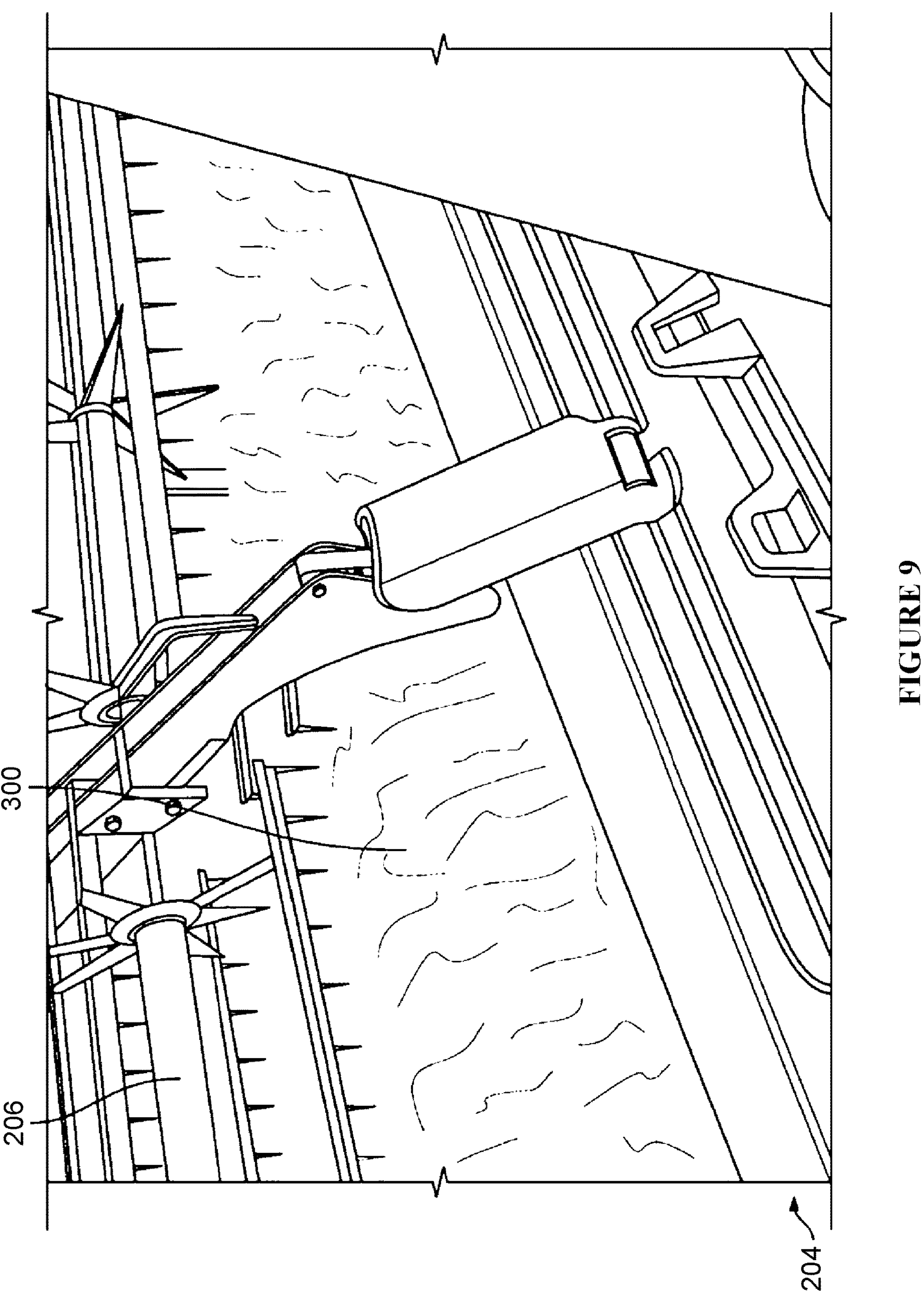
FIG. 9 illustrates a perspective view of an exemplary blockage of crop material flow through the exemplary draper belt header.

However, in certain instances, a blockage or blockage 300 (FIG. 9) can be encountered in the use of the header 204 that prevents the flow of crop material through the header 204 and to the feederhouse 214 for subsequent downstream processing. For example, the blockage 300 can result from an excess accumulation of crop material, be associated with debris in the header 204, or result from contact by a moving portion of the header 204 with a stationary obstacle or object, including, for example, a portion of a fence, rock, or branch, among debris. In response to such situations, also referred to as slip events, in which the reel 206 experiences a blockage or blockage 300 when the reel 206 is in the harvest position (FIG. 8A), a slip clutch that is coupled to the reel 206 and a driver that provides power for rotational displacement of the reel 206 can slip, or, alternatively, in other embodiments, a pressure relief valve in the circuit that prevents overload can open, so as to prevent damage to the driver and any associated gearbox, among other components used in the rotational displacement of the reel 206. Further, in response to slippage of a slip clutch or, alternatively, a slip event relating to an opening of the pressure relief valve, the header 200 or reel 206, or both, can be moved to a variety of different positions in at least an attempt to prevent damage to the harvester 200, including to a drive system that drives movement of the reel 206, outer belt conveyors or side belts 224, and central belt conveyor 228. Moreover, such movement of the header 200 or reel 206 can be configured to prevent components of such drive system(s) from experiencing damage associated with the drive system(s) being subjected to excessive torques. For example, in at least an attempt to clear a blockage or blockage 300, or corrective action to avoid continued contact with the obstacle, the reel

Figure 8B:
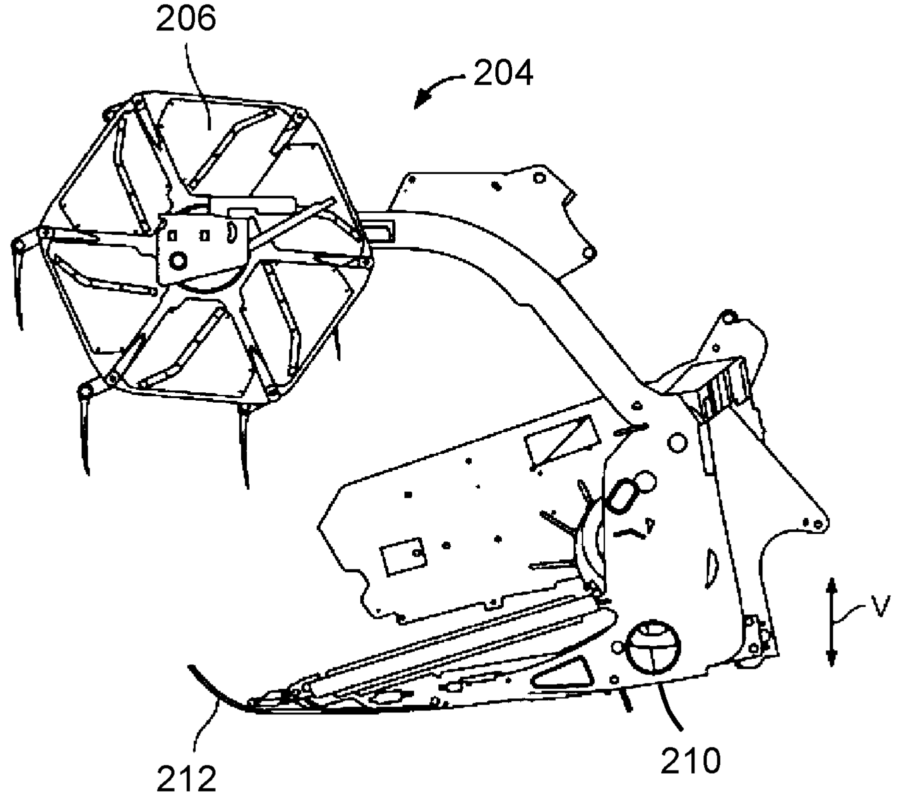
Figure 8C:
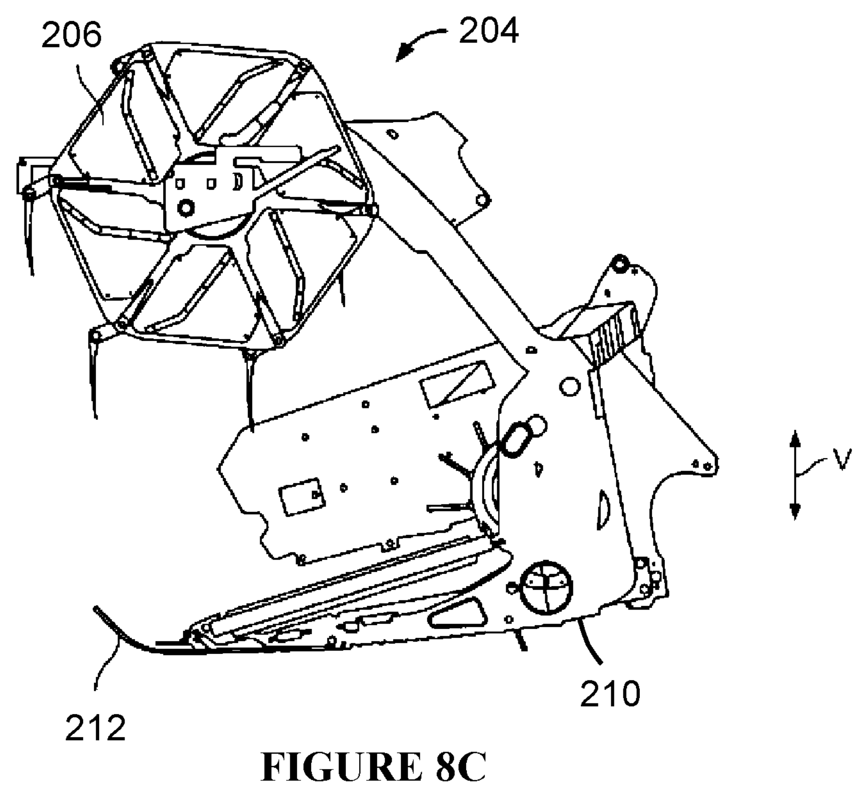
Figure 8D:
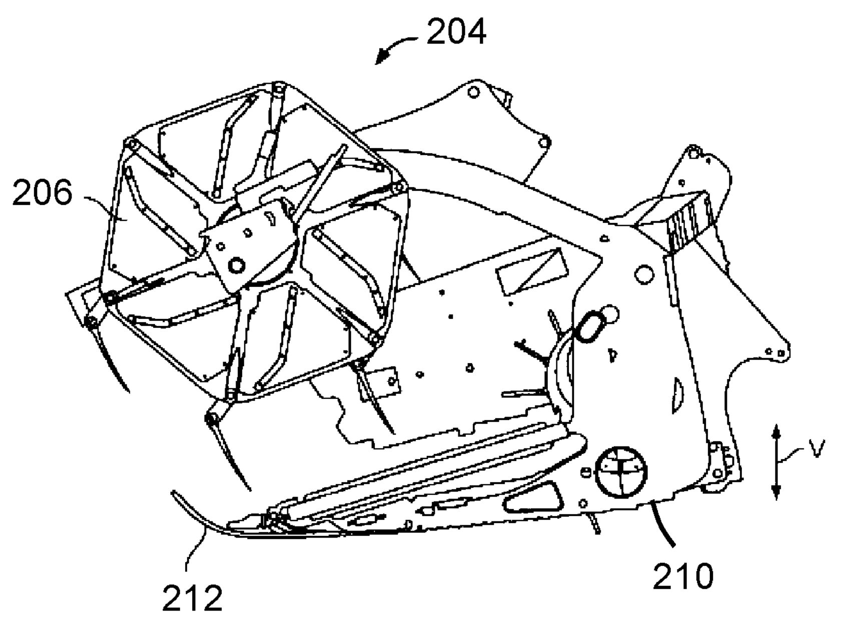

206 can be displaced to a raised forward position (FIG. 8B), from the raised position to a rearward position (FIG. 8C), and from the rearward position to a lowered position (FIG. 8D). While reference is made above to specific positions, namely the harvest, raised, rearward, and lowered positions, the header 200 or reel 206, including the associated actuators 230, 232, 234, 236, can be configured to displace the header 200 or reel 206, among other components of the header 200, to a variety of other positions.

Header slip events can also include events that do not necessarily involve a slipped clutch, including, for example, the opening of the above-mentioned pressure relief valve, as well as other slip events at drive systems, or portions thereof, that do not include a slipped clutch. Further, such blockages or obstructions encountered by the header 200 can not only cause slip events but can also be related to the occurrence of header stall events in which such blockages or obstructions can create interferences that can prevent the displacement of various components of a header, regardless of the type of header. Moreover, header stall events can correspond to certain situations in which the presence of such blockages can stall a displacement, including a rotational or linear displacement, of one or more components of the header. Thus, such stall events can be the result of a blockage or other obstruction that directly or indirectly prevents movement of such components. For example, a stall event can involve an obstruction that prevents linear displacement of one or more components that is to otherwise occur by the operation of linear actuators or hydraulic cylinders. Moreover, such stall events relating to a stall in linear displacement can involve, for example, corn heads, end fenders, folding of wings of a header, deck plates, lock cylinders, drapers, gauge wheel position, and float cylinders, among others. Additionally, for example, such stall events can also relate to the reel 206 being prevented from being at least linearly displaced to a raised or lowered position or a fore or aft position, as discussed below for example, with respect to at least FIGS. 8A to 8D.

With respect to the draper belt header 204 shown in at least FIG. 5, a header slip event can relate a slippage of a conveyor belt of at least one of the side belts 224 or the central belt conveyor 228. In such situations, a blockage, such as for example, a plug or other obstacle, can provide a resistance that can prevent, or reduce, movement of the conveyor belt, which can result in strain and stress on the belt, as well as components of the associated drive system, that can damage the drive system. As another example, in certain instances, a drive roller of the drive system that is powered to rotate in a manner that facilitates rotational displacement of the side belts 224 can continue to rotate while the side belts 224 are not moving or rotating. In such a situation, the continued rotation of the drive roller can lead to the drive roller burning through or otherwise damaging the side belts 224, which are often constructed from rubber.

Figure 10:
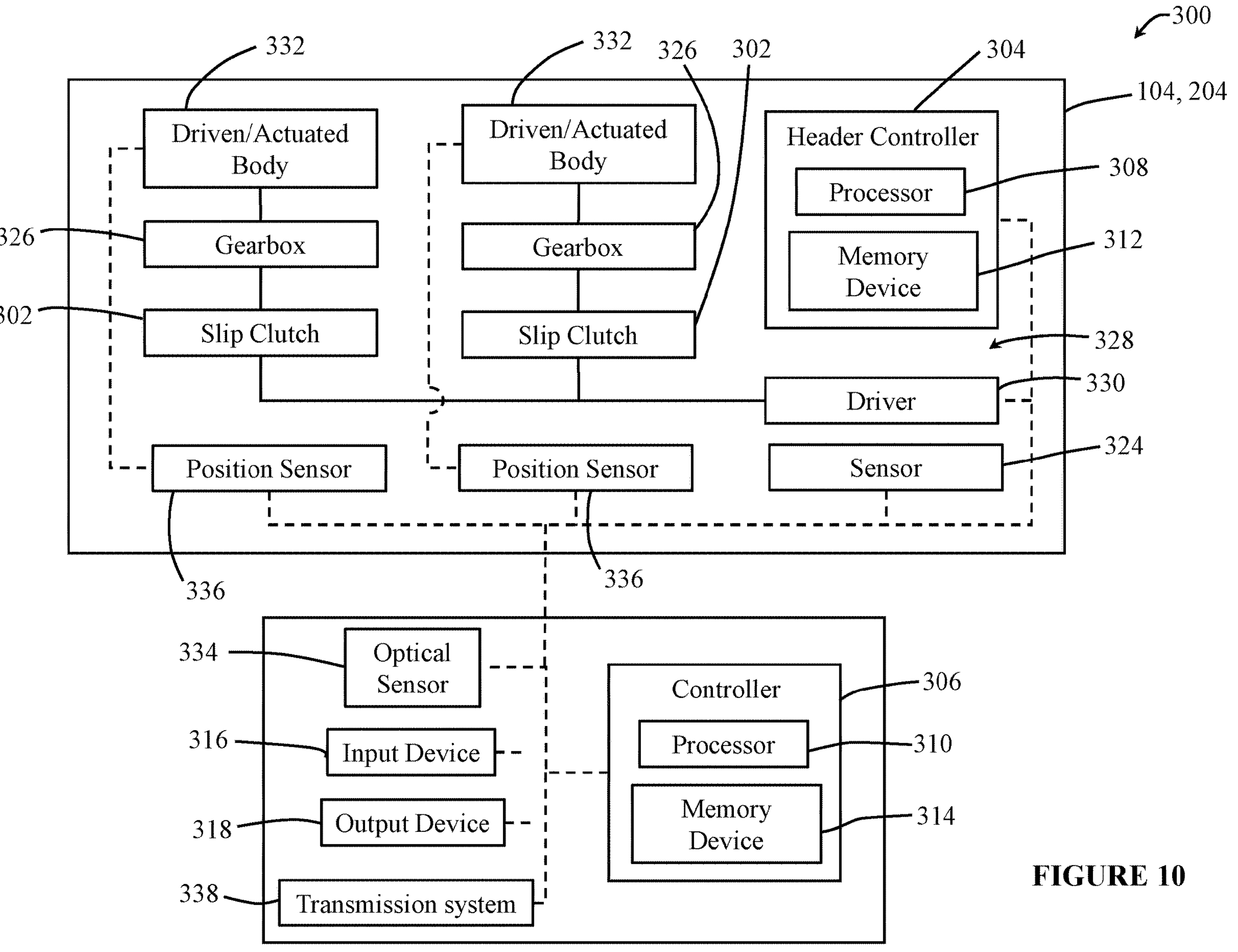
FIG. 10 illustrates a block diagram of an exemplary system configured for resolving a header slip or stall event.

FIG. 10 illustrates a block diagram of an exemplary system 300 configured for resolving a trigger event that has triggered either by at least one slip clutch 302 or detection of a stall event. The system 300 can include one or more controllers 304, 306, each controller 304, 306 having one or more processors 308, 310 that can follow instructions, including control instructions, contained with, or are part of, one or more memory devices 312, 314, including, for example, a non-transitory machine-readable medium. The exemplary embodiment shown in FIG. 10 illustrates one or more first controllers 304 positioned at the header 104, 204, and one or more second controllers 306 being at another portion of the combine harvester 100, 200. In such an embodiment, the first controller(s) 304 can be utilized with respect to operations involving the header 104, 204, including with respect to operation of systems or subsystems of the header 104, 204, while the second controller(s) 306 can include a central controller 306, such as, for example, a central vehicle controller, among other controllers. Further, the agricultural harvester 100, 200 can include one or more other controllers 304, 306 that can be positioned at a variety of locations about the combine harvester 100, 200.

At least one controller 304, 306 can also be coupled to one or more input devices 316 and output devices 318, which together can, according to certain embodiments, include an input or output device, or combination thereof. A variety of different types of devices can be utilized as the input device 316, including, for example, a touch screen, keyboard, keypad, mouse, switch, joystick, or button, as well as any combinations thereof, among other types of input devices 316. Similarly, a variety of different types of devices can be utilized as the output device 318, including, for example, a monitor, screen, display, touch screen, or speaker, as well as any combinations thereof, among other types of output devices 318. According to certain embodiments, the input and output devices 136, 138 can be positioned in an operator cab 102 of the combine harvester 100, 200. Additionally, or alternatively, the input and output devices 136, 138 can be part of a mobile or handheld device or other device that can be remotely located from the combine harvester 100, 200.

At least one controller 304, 306 can generate a signal for operation of a drive system 328 that can include at least one driver 330, slip clutch 302, and, optionally, a gear assembly 326, that can be utilized in the transmission of power used by one or more driven or actuated bodies 332 of the header 104, 204. The driver 330 of the drive system 328 can be utilized to either or both generate and provide power utilized to directly or indirectly displace one or more of the driven bodies 332. The particular type of driver 330 and driven bodies 332 can vary for different types of headers 104, 204. For example, according to certain embodiments in which the header 104 is a corn header the driver 330 can include one or more of an engine of the combine harvester 100 or a motor, including, but not limited to, an electric motor, as well as combinations thereof. With such an embodiment, the driven body(ies) 332 can include a gathering chains 140, 146, stock rolls 154, 156, and associated choppers, among other driven components of the header 104 or associated row units 108. Additionally, according to certain embodiments in which the header 204 is a draper belt header, the driver 330 can provide power for rotational displacement of the reel 206, one or both of the side belts 224, and the central belt conveyor 228, among other driven bodies 332. According to such embodiments, the driver 330 can be a motor, including, for example, an electric motor, among other drivers. Additionally, or alternatively, the driver 330 can be used to provide a force for operation of one or more pumps, including, but not limited to, pumps that can be utilized to control the flow and pressure of a fluid used in the operation of one or more of the actuators 230, 232, 234, 236, used in displacing components of the header 204, among other actuators involved in the displacement of the header 204.

As shown in at least FIG. 10, and as discussed above, the driver 330 can be indirectly coupled to the driven body 332. Moreover, power transmitted by the driver 330 can be delivered, including via one or more drive shafts 128 (FIG. 4) to a slip clutch 302, including, for example, one or more of the slip clutches 130 shown in FIG. 4, among others. Further, as also previously discussed, each slip clutch 302 can be coupled to an associated gear assembly 326, including, but not limited to, the gear assemblies 126, 162 shown in FIG. 4.

In the illustrative embodiment, the combine harvester 100, 200 includes at least one sensors 324 that are configured to detect either or both an occurrence of a slippage of one or more slip clutches 324 of the header 104, 204 or a stall in displacement of one or more components of the header 104, 204. A variety of different types of sensors, or combination of sensors, can be utilized as a sensor 324 that detects slippage of one or more of the slip clutches 324, including, but not limited to, a speed sensor, accelerometer, pressure sensor, or optical sensor, as well as combinations thereof. Further, one or more sensors 324, including for example, a position sensor, can also be utilized to identify a stall in displacement of one or more components of the header 104, 204. Further, the information detected or provided by the one or more sensors 324 can be communicated to, and evaluated by, a controller to determine whether there is, or is not, an occurrence of a triggering or slippage of one or more of the slip clutches 302, or a stall in displacement of one or more components of the header 104, 204.

For example, according to certain embodiments, the sensor 324 can be a single axis accelerometer that is configured to measure vibration profiles along at least a portion of the header 104, 204. According to such an embodiment, the measured vibration profiles can be evaluated by at least one controller 304, 306 to determine whether information in such vibration profiles provides an indication that at least one slip clutch 302 has been triggered such that the associated driven body 332 or associated gear assembly 326 is not being driven by a force provided by the driver 330. Additionally, or alternatively, the sensor 324 can include a pressure sensor that can detect a pressure level for a fluid, including a pneumatic or hydraulic fluid used to actuate one or more driven bodies, including, but not limited to, pneumatic or hydraulically actuated cylinders. Further, according to certain embodiments, the sensor 324 can be an optical sensor 334 that can provide information for detection of either or both a slip event and a stall event via capturing information indicating a stoppage or absence of motion along one or more components of the header 104, 204, including, but not limited to, a gathering chain(s) 112, stalk roll(s) 154, 156, chopper(s), reel 206, side belt(s) 224, or the central belt conveyor(s) 228, among other components of the header 104, 204.

The system 300 can also include one or more position sensors 336 that can be utilized to identify at least an initial position of one or more components of the header 104, 204. For example, according to certain embodiments, the position sensor 336 can provide an indication of a position of one or more of the deck plates 114, 116 of a corn header 104, or a position of the real 206 of the draper belt header 204. For example, with respect to the reel 206, one or more position sensors 336 can indicate a vertical position of the real 206, including, for example, with respect to the adjacent ground or other portions of the header 204. Additionally, one or more sensors can also provide an indication of a fore or aft position of the real 206. The initial positions, as indicated or determined using information from the position sensors 336 can be recorded by a controller, including, for example, by one or more of the memory devices. As discussed below, such information can be utilized in connection with returning certain components of the header 104, 204 to those components initial position(s) after those components had previously been displaced in connection with clearing a blockage 300.

While the drive system 300 shown in FIG. 10 includes a plurality of slip clutches 200, slip events can, for at least certain types of headers 204, not be associated with the triggering of a slip clutch 302. For example, as previously discussed, at least certain drive systems, or portions thereof, may not include a slip clutch 302. For example, instances of belt slippage associated, for example, with a conveyor belt of a side belt(s) 224 or central belt conveyor 228 can be a slip event that does not involve a slip clutch 302. According to such an embodiment, the sensor 324 can be, for example, a load or pressure sensor that can detect load on the driver(s) 330 that provides the power for rotational displacement of the conveyor belt of the side belt(s) 224 or the central belt conveyor 228. Additionally, or alternatively, the optical sensor 334 or the operator of the combine harvester 100, 200 can be utilized to detect such belt slippage.

Figure 11:
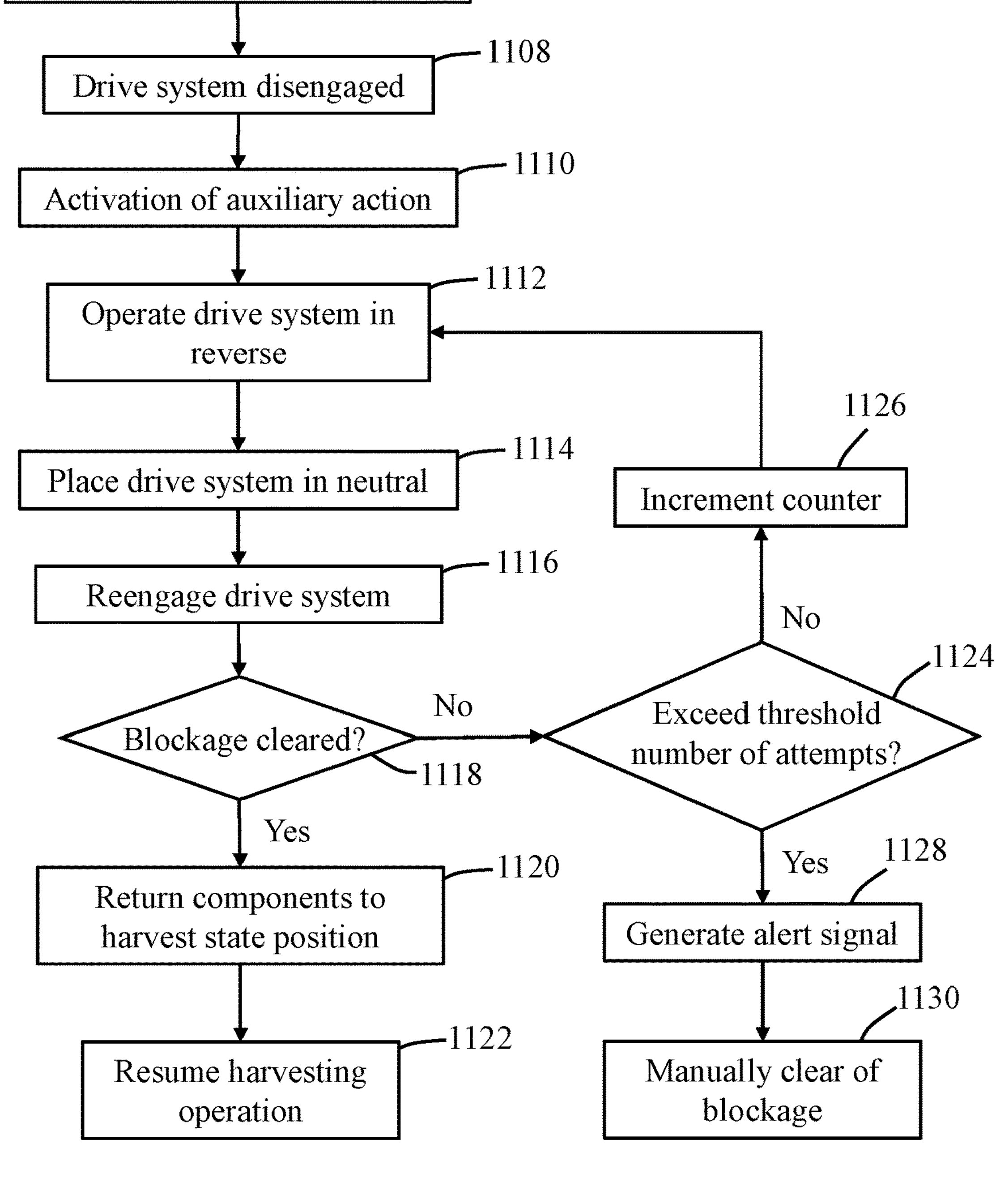
FIG. 11 illustrates a simplified flow diagram of an exemplary method for partially automated resolution of a header slip or stall event.

FIG. 11 illustrates a simplified flow diagram of an exemplary method 1100 for partially automated resolution of a header slip or stall event. The method 1100 is described below in the context of being carried out by the illustrated exemplary system 300. However, it should be appreciated that method 1100 can likewise be carried out by any of the other described implementations, as well as variations thereof. Further, the method 1100 corresponds to, or is otherwise associated with, performance of the blocks described below in the illustrative sequence of FIG. 11. It should be appreciated, however, that the method 1100 can be performed in one or more sequences different from the illustrative sequence. Additionally, one or more of the blocks mentioned below may not be performed, and the method 1100 can include steps or processes other than those discussed below.

During operation of the combine harvester 100, 200, the combine harvester 100, 200, including, for example, the associated header 104, 204, can be operating in a harvesting state at which, while traveling in the first, forward direction of travel 105, the combine harvester 100, 200 is harvesting crop material. Moreover, while operating the harvesting state, the driver 330 of the drive system 328 can be operating in the first, or forward direction, such that crop material being harvested by the combine harvester 100, 200 can be obtained via the operation of the header 104, 204, and directed to an associated feederhouse 106, 214. For example, with respect to the exemplary combine harvester 100 illustrated in at least FIG. 1, while operating in the harvesting state, as the header 104 of the combine harvester 100 travels in the forward direction of travel 105, the header 104 can be separating corn ears from corn stalks, as well as deliver the separated corn ears to the associated feederhouse 106, as previously discussed. Similarly, with respect to the exemplary combine harvester 200 shown in at least FIG. 5, while operating in the harvesting state, the header 204 can be cutting crop material, as well as deliver the cut crop material to the associated feederhouse 214.

However, in at least certain instances, while operating in the harvesting state, the header 104, 204 can experience, or otherwise encounter one or more blockages, including, but not limited to, blockages 300 that can result in a slip or stall event for the header 104, 204. For example, as previously discussed, such a slip event can correspond to a slippage of at least one slip clutch 302, or a belt slip, such as, with respect to the conveyor belt of one or more of the side belt(s) 224 or central belt conveyor 228. Further, such a stall event can relate to a presence of an object that prevents displacement of one or more components of the header 104, 204. Accordingly, as seen in FIG. 11, the occurrence of a slip or stall event can be detected at block 1102. As previously discussed, the occurrence of a slip or stall event can be detected in a variety of manners. For example, as discussed above, information from one or more slip or stall sensors 324 or optical sensors 334 can contain, or provide information that can be used to derive by the controller 304, 306, an indication that at least one slip clutch 302 has experienced a slippage, a conveyor belt or other belt of the header 104, 204 is experiencing a belt slippage, or one or more components are experiencing a stall in displacement. In response to a detection of the slip or stall event, the controller 304, 306 can, at block 1104, generate an alert that can be communicated to an operator of the combine harvester 100, 200, including, but not limited to, either or both a visual or audible alert that can be communicated via an output from the output device 318.

In response to detection of the alert, an operator of the combine harvester 100, 200 can bring the combine harvester 100, 200 to a stop at block 1106. For example, in response to receipt of an input provided by the operator using the input device 316, the controller 304, 306 can provide one or more instructions to a transmission system 338 (FIG. 10) of the combine harvester 100, 200 that can facilitate at least a temporary stoppage in travel of the combine harvester 100, 200, and in particular, movement in at least the first, forward direction 105. Additionally, or alternatively, according to certain embodiments, the operator can first move the header 104, 204 or the combine harvester 100, 200 away from the header harvest position, including out of the crop material that is being, or will be, harvested by the combine harvester 100, 200. For example, in response to being altered to the detection of the slip or stall event, the operator can, via the input device 316, issue one or more commands that can result in the transmission system 338 operating in a manner that moves the header 104, 204 and combine harvester 100, 200 in the reverse direction of travel 107, and out of crop material, and thus away from the header harvest position. Additionally, or alternatively, at block 1106, moving the header 104, 204 away from the header harvest position can involve a vertical position of the header 104, 204 relative to the adjacent ground being adjusted, such as, for example, the header 104, 204 being raised so as to move the header 104, 204 out of the crop material.

In response to the input signal generated by operator using the input device 316 in connection with stoppage of the combine harvester 100, 200 at block 1106, or in response to another input signal generated by another use of the input device 316 by the operator, at block 1108 the controller 304, 306 can also generate a signal for a disengagement of the drive system 328 of the combine harvester 100, 200. For example, according to certain embodiments, the controller 304, 306 can, in response to a command provided by the operator, generate a signal that at least temporarily deactivates the driver 330, or otherwise facilitates a prevention of a transmission of power from the driver 330 to at least the driven bodies 332. Accordingly, such disengagement of the drive system 328 can at least temporarily stop a supply of power to at least the one or more components of the header 104, 204 that has experienced the blockage 300, including an obstacle, that has resulted in the occurrence of the slip or stall event. Moreover, according to certain embodiments, at block 1108, the driver 330 can cease operating in the first, forward direction, and may also not be operating in the second, reverse direction. Additionally, or alternatively, the drive shaft 128 at block 1108 can be disengaged, such as, for example, by a clutch between the driver 330 and the drive shaft 128, such that power from the driver 330 is not being transmitted to other components driven by the operation of the driver 330.

With the drive system 328 disengaged, at block 1110, the controller 304, 306 can issue one or more signals to facilitate activation of one or more auxiliary actions. The auxiliary actions can correspond to one or more actions taken with respect to systems, subsystems, or components (collectively referred to herein as components) of the header 104, 204 that can at least assist in dislodging the blockage 300, that has resulted in the slip or stall event, including, for example, the slippage of the slip clutch(es) 302 or belt slip. The type of auxiliary actions taken can at least partially depend on the type of header 104, 204 that is coupled to the combine harvester 100, 200. According to certain embodiments, the auxiliary action can correspond to moving one or more components of the header 104, 204 relative to other portions of the header 104, 204 from a position, or harvesting position, the component had while the combine harvester 100, 200 was operating in the harvesting state prior to the slip or stall event.

According to certain embodiments, the harvesting position of the component can be identified or recorded by the controller 304, 306 using, for example, information provided by one or more sensors, including, for example, a position sensor 336 or optical sensor 334, among other sensors. Alternatively, or additionally, the extent the component(s) is displaced from the corresponding harvest position can be measured or determined by information provided during the displacement of the component(s) in association with performance of the auxiliary action. Further, the extent, including distance, a component(s) is displaced from the corresponding harvest position for that component(s) can be based on repositioning the component(s) at a position or location that can assist with removal, dislodging, clearing, or unclogging of the blockage 300 from the header 104, 204. As seen below with respect to at least blocks 1310 and 1410 of the methods 1300, 1400, respectively, discussed below in FIGS. 14 and 15, examples of such auxiliary actions can include, but are not limited to, displacing at least one deck plate 114, 116 to increase the size (e.g., width) of the channel 124 therebetween, and vertically raising the reel 206, among other auxiliary actions.

With respect to certain embodiments, the auxiliary actions taken at block 1110 can also include, or occur after, a recording the initial setting, or position, of the component being adjusted via the auxiliary action. For example, prior to the occurrence of the auxiliary action, a position, as indicated by a position sensor 336, among other sensors or recordings, of the component that is to be displaced by the auxiliary action, can be recorded, for example, at the memory device 312, 314.

At block 1112, the controller 304, 306 can issue one or more commands that facilitate the drive system 328 being operated in reverse, such as, for example, via operation of the driver 330 in the second, reverse direction. Such reversal in the direction of operation of components of the drive system 328, including the driver 330, can facilitate the corresponding driven body(ies) 332 being displaced, including rotated, in a corresponding second, reverse direction that is opposite to the direction the components operate when the combine harvester is operating in the harvesting state. By being displaced in the second, or reverse, direction, rather than directing crop material at least inwardly towards the header 104, 204 or associated feederhouse 106, 214, the driven bodies 332 can instead at least attempt to push or otherwise displace crop material, including crop material other debris causing the blockage 300, away from, or out of, the header 104, 204 or from the associated feederhouse 106, 214. Moreover, by operating in reverse, the driven bodies 332 can seek to dislodge or otherwise remove the blockage 300 that caused the slip or stall event from the header 104, 204. The duration at which the drive system 328 is operated in reverse can be based on a variety of criteria. For example, according to certain embodiments, the drive system 328 can be operated in reverse for a predetermined amount of time.

At block 1114, the controller 304, 306 can issue one or more commands to place the drive system 328 in neutral before the controller 304, 306 generates commands to have the drive system 328 subsequently reengaged at block 1116. Such reengagement of the drive system 328 can include the driver 330 being activated, or otherwise placing the drive system 328 in a condition in which power generated by operation of the driver 330 is transmitted to power operation, including movement, one or more of the driven bodies 332. Additionally, such reengagement of the drive system 328 at block 1116 can include resuming operation of the driver 330 in the first, or forward, direction. Such operation of the driver 330 in the first, or forward, direction can result in at least some of the driven bodies 332 being displaced, such as rotated, in the same direction that the driven bodies 332 were operating while the combine harvester 100, 200 and associated header 104, 204 were operating in the harvesting state prior to the slip or stall event.

At block 1118, the controller 304, 306 can determine whether the blockage 300 has been cleared or otherwise removed from the header 104, 204. Such a determination at block 1118 can, according to certain embodiments, use information provided by one or more of the sensors 324, including, for example, optical sensors 334, that is obtained while the drive system 328 is reengaged. For example, in certain instances in which the blockage 300 has not been cleared, subsequent reengagement of the drive system 328 at block 1116 can again result in triggering or slippage of one or more of the slip clutches 302, continued belt slippage, or continued stall of one or more components. Such determination of whether the slip or stall event is still unresolved at block 1118 can be performed in a manner similar to that discussed above with respect to detection of the slip event at block 1102. However, a variety of other information can be examined at block 1118 by the controller 304, 306 to determine whether the blockage 300 has been removed or released from the header 104, 204, or that the blockage 300 is otherwise no longer presenting an issue that is causing slippage of a slip clutch 302 or a stall in the displacement of one or more components of the header 104, 204.

If the controller 304, 306 determines at block 1118 that the blockage 300 has been cleared, then components of the header 104, 204 that were adjusted in connection with the auxiliary actions taken at block 1110 can be returned to the corresponding harvest position for that component(s). Whether the components that were displaced in response to the auxiliary actions taken at block 1110 have returned to their corresponding harvest position can be determined in a variety of different manners. For example, according to certain embodiments, as mentioned above, positional information corresponding to the harvest position can have been recorded before, or obtained, from a position sensor(s) 336 or optical sensor(s) 334 prior to, or during, activation of the auxiliary action at block 1110. Such information can similarly be used by the controller 304, 306 to determine if, or when, a component has been returned at block 1120 the associated harvest position for that component. Further, the return of components to their harvest position can also include returning the header 104, 204 to a position at which the header 104, 204 is, or will be upon travel of the combine harvester 100, 200 in the forward direction of travel 105, within crop material that is to be harvested. Such a return of the header to a position to be within the crop material to be harvested can be controlled via commands provided by the operator via the input device, or be automatically controlled by the controller 304, 306.

With the components returned to the harvest position, and the blockage 300 cleared, as determined at block 1118, the combine harvester 100, 200 can return to operating in the harvesting state at block 1122. Moreover, at block 1122, the combine harvester 100, 200 can resume the agricultural operation in which the header 104, 204 was performing prior to the detection of the slip or stall event. Such return of the combine harvester 100, 200 to operating in the harvesting state can be automatic, such as, for example, by the controller 304, 306 generating one or more signals that facilitates an automatic return to the harvesting state in response to a determination that the blockage 300 has been cleared and an indication, such as, for example, from one or more sensors 324 that the components returned to the harvest position. Alternatively, resumption of the harvesting state at block 1122 can commence in response to a command inputted, via an input device, by the operator of the combine harvester 100, 200.

If, however, the outcome of the determination by the controller 304, 306 at block 1118 is the blockage 300 has not been cleared, then, according to certain embodiments, the controller 304, 306 can determine whether the number of attempts to clear the blockage 300 has exceeded a threshold number of attempts. The threshold number of attempts to clear the blockage 300 can be predefined, including, for example, set by the operator. Additionally, the number of threshold attempts can be set to prevent or minimize damage to the header 104, 204 associated with repeatedly reengaging the drive system 328 in connection with unsuccessful attempts to clear the blockage 300. If the controller 304, 306 determines the number of attempts to clear the blockage 300 has not yet exceeded the threshold number, then a counter of the controller 304, 306 that can be used to track the number of unsuccessful attempts to clear the blockage 300 can be incremented accordingly at block 1126. Further, in response to the determination at block 1124 that the number of unsuccessful attempts to clear the blockage 300 does not exceed the threshold number of attempts, the method 1100 can return to block 1112, and the drive system 328 can again be operated in reverse in connection with another attempt to clear the blockage 300.

If, however, the controller 304, 306 determines at block 1124 that the number of prior attempts to clear the blockage 300 has exceeded the threshold number of attempts, then at block 1128 the controller 304, 306 can generate an alert signal for communication to the operator. Such an alert signal can be outputted via use of the output device 318, including via communication of a visual or audible signal from the output device 318. Moreover, the communication provided to the operator at block 1128 can provide an indication that the operator is to, at block 1130, resort to other manners for removal of the blockage 300, including, but not limited to, the operator manually clearing the blockage 300 from the header 104, 204.

As seen in FIG. 11, once the blockage 300 is removed from the header 104, 204 at block 1130, resumption of operating the combine harvester 100, 200 in the harvesting state can resume at block 1122. Further, the method 1100 can continuously be implemented in response to detection of slip or stall events during the duration of the harvesting operation being performed by the combine harvester 100, 200.

Figure 12:
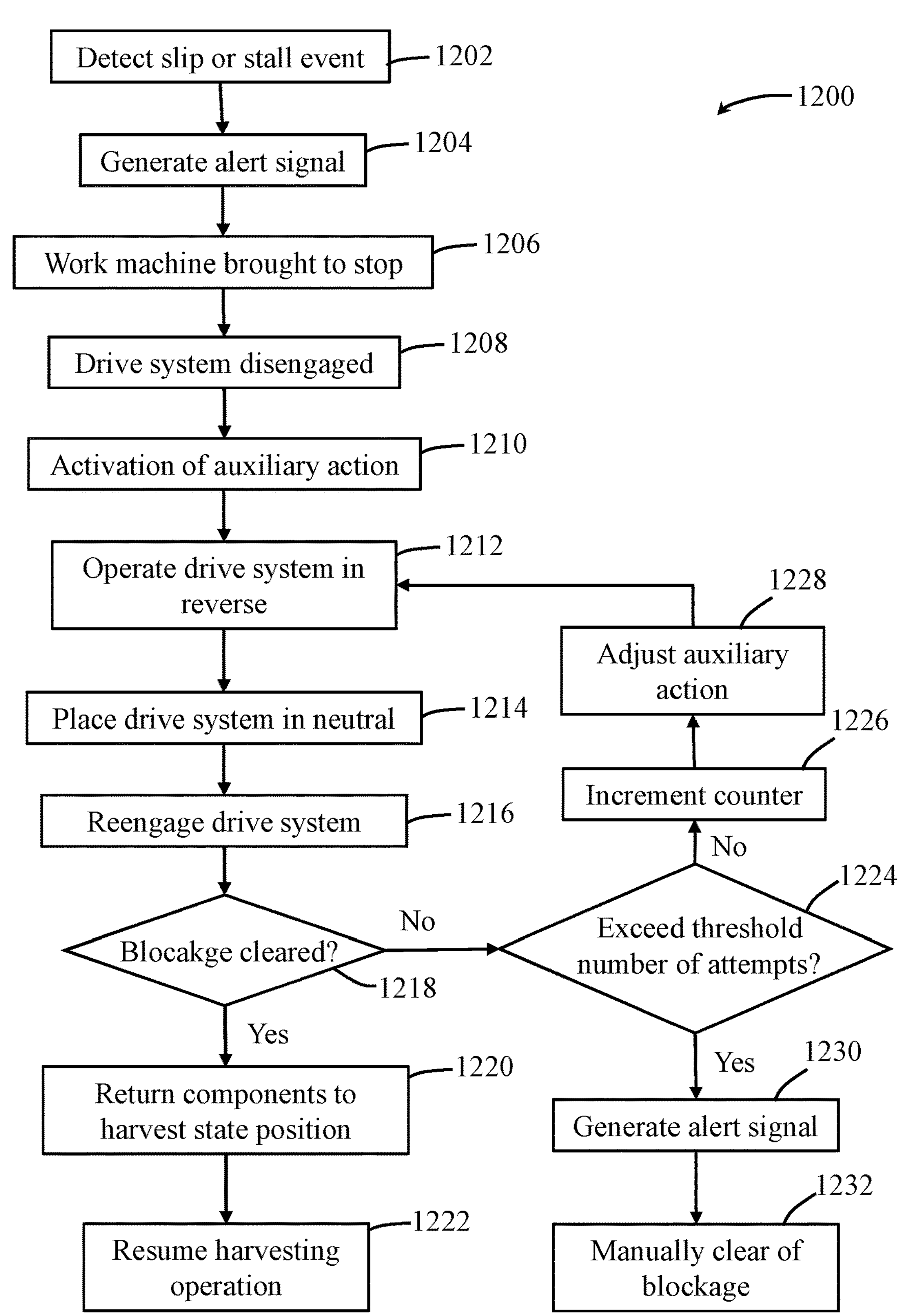
FIG. 12 illustrates a simplified flow diagram of another exemplary method for partially automated resolution of a header slip or stall event.

FIG. 12 illustrates a simplified flow diagram of an exemplary method 1200 for partially automated resolution of a header slip or stall event. The method 1200 is described below in the context of being carried out by the illustrated exemplary system 300. However, it should be appreciated that method 1200 can likewise be carried out by any of the other described implementations, as well as variations thereof. Further, the method 1200 corresponds to, or is otherwise associated with, performance of the blocks described below in the illustrative sequence of FIG. 12. It should be appreciated, however, that the method 1200 can be performed in one or more sequences different from the illustrative sequence. Additionally, one or more of the blocks mentioned below may not be performed, and the method 1200 can include steps or processes other than those discussed below.

The method 1200 shown in FIG. 12 is generally similar to that discussed above with respect to the method 1100 shown in FIG. 11. However, in the embodiment shown in FIG. 12, in response to a determination by the controller 304, 306 that the blockage 300 has not been cleared, the auxiliary action can be adjusted including, for example, supplemented or incremented in a manner that at least attempts to assist in removal of the blockage 300. Further, while such supplementation or incrementing the auxiliary action is discussed herein with respect to the method 1200 shown in FIG. 12, optionally, such features can also be incorporated into each of the other methods 1100, 1300, 1400, 1500, 1600, 1700 disclosed herein.

More specifically, detection of a slip or stall event at block 1202, generation of an alert signal at block 1204, movement of the combine harvester 100, 200 out of the crop material and associated stoppage at block 1206, disengagement of the drive system 328 at block 1208, and activation of an auxiliary action at block 1210 for the method 1200 illustrated in FIG. 12 can be similar to above-discussed blocks 1102, 1104, 1106, 1108, and 1110, respectively, of the method 1100 shown in FIG. 11. Further, operation of the drive system in reverse at block 1212, placement of the drive system 328 in neutral at block 1214, reengaging the drive system 328 at block 1216, determining whether the blockage 300 is cleared at block 1218, and, if the blockage 300 is not cleared, determining whether the number of attempts to remove the blockage 300 at block 1224 and an associated incrementing of the counter at block 1226 can be similar corresponding discussions above with respect to blocks 1112 through 1126 for the method 1100 illustrated in FIG. 11. However, with respect to the method 1200 shown in FIG. 12, in response to determinations by the controller 304, 306 that the blockage 300 has not been cleared, and that the threshold number of attempts to remove the blockage 300 has not been exceeded, at block 1228 one or more of the auxiliary actions previously taken at block 1210 can be supplemented. For example, according to certain embodiments in which the auxiliary action relates to increasing the size (e.g., width) of the channel 124 between the deck plates 114, 116, at block 1228 a driver can be actuated so as to further increase the width of the channel 124. Thus, according to such an example, at block 1228, a driver that is coupled to one or both of the deck plates 114, 116 can again be operated so as to displace one or both of the deck plates 114, 116 away from the other deck plate 114, 116 and thereby increase the corresponding size of the channel 124. Thus, such supplemental auxiliary actions at block 1228 can be performed following at least one prior unsuccessful attempt at clearing the blockage 300. Additionally, according to certain embodiments, the number of times an auxiliary action this supplemented at block 1228 can be limited, such as, for example, by a limit on the overall distance that the component(s) being adjusted by the auxiliary action can be displaced.

With respect to the remainder of the blocks shown in FIG. 12, namely blocks 1220 (return of components to harvest position), 1222 (resumption of harvest operation), 1230 (generation of alert signal), and 1232 (manually clearing the blockage 300), those blocks, and the associated portions of the illustrated method 1200, can be similar to above-discussed blocks 1120, 1122, 1128, and 1130 for the method 1100 depicted in FIG. 1100.

Figure 13:
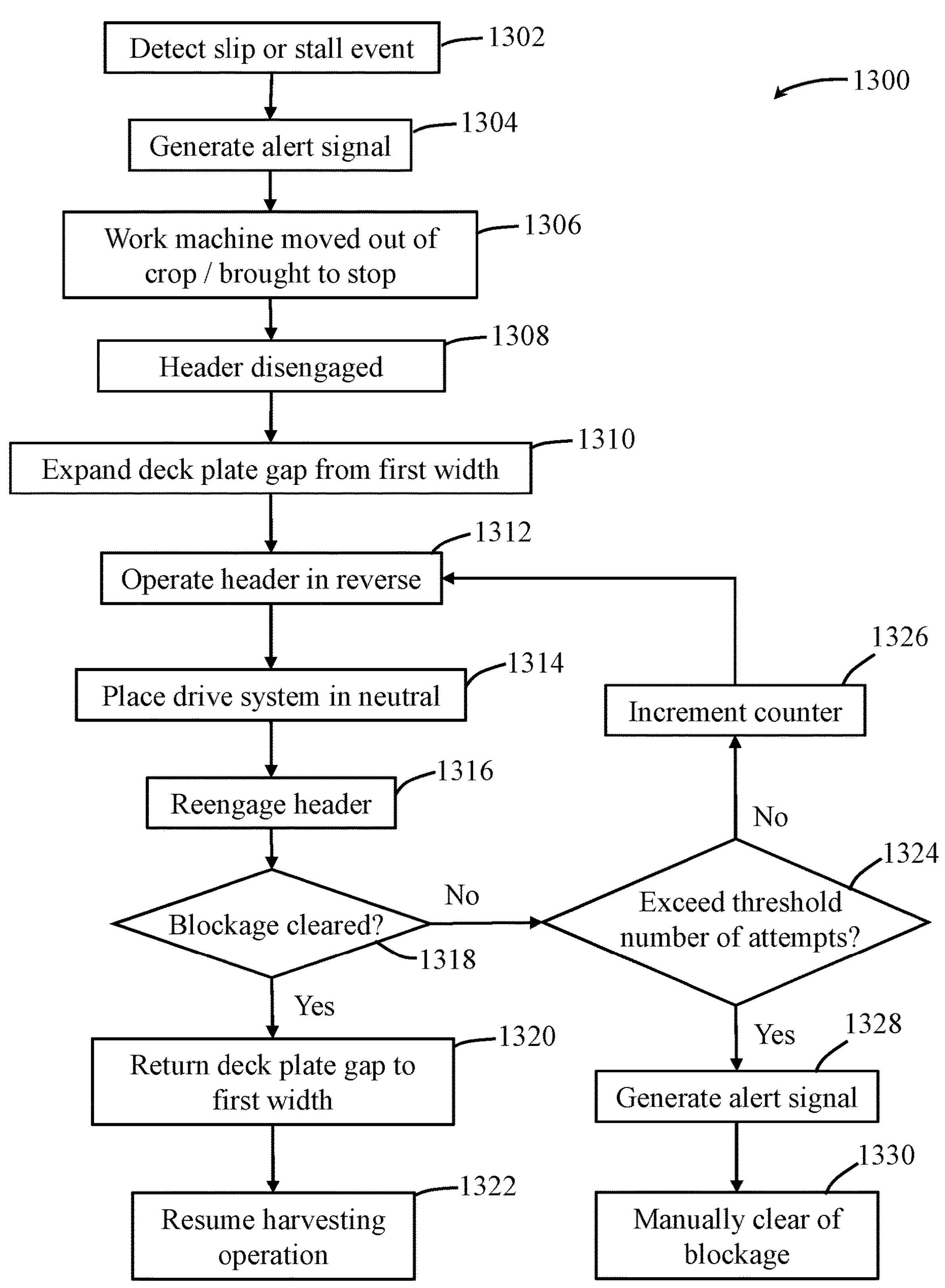
FIG. 13 illustrates a simplified flow diagram of an exemplary method for partially automated resolution of a header slip or stall event involving a corn header.

FIG. 13 illustrates a simplified flow diagram of an exemplary method 1300 for partially automated resolution of a header slip or stall event involving a corn header. The method 1300 is described below in the context of being carried out by the illustrated exemplary system 300. However, it should be appreciated that method 1300 can likewise be carried out by any of the other described implementations, as well as variations thereof. Further, the method 1300 corresponds to, or is otherwise associated with, performance of the blocks described below in the illustrative sequence of FIG. 13. It should be appreciated, however, that the method 1300 can be performed in one or more sequences different from the illustrative sequence. Additionally, one or more of the blocks mentioned below may not be performed, and the method 1300 can include steps or processes other than those discussed below.

The method 1300 depicted in FIG. 13 is generally similar to the method 1100 discussed above with respect to FIG. 11 but is more specifically directed to embodiments in which the header 104 is a corn header. Thus, the above disclosure relating to blocks 1102 through 1130 for the method 1000 discussed above with respect to FIG. 11 is also generally applicable to each of the blocks 1302 through 1330, respectively, for the method 1300 illustrated in FIG. 13. Further, as the method 1300 pertains to a corn header 104, the detected slip or stall event at block 1302 can, for example, relate to a slippage of a slip clutch 302 that may, for example, be related to a blockage, such as, for example, a blockage 300, interfering with the operation of one or more row units 108 or choppers. For example, as previously discussed, such a trigger event can relate to a blockage 300 interfering with the rotational displacement of one or more gathering chains 112 or stock rolls 154, 156.

Additionally, block 1310 illustrates an example of a particular type of auxiliary action that could, for a corn header 104, be performed as the auxiliary action at blocks 1110, 1210, and 1228 for the methods 1100, 1200 illustrated in FIGS. 11 and 12. More specifically, with the drive system 328 disengaged (block 1308), at block 1310 a controller 304, 306 can, for an auxiliary action, issue one or more signals to facilitate displacement of one or both of the deck plates 114, 116 so as to increase the size (e.g. width) of the channel 124 therebetween. Such an increase in the size of the channel 124 can relate to a change in the size of the channel 124 when one or both of the deck plates 114, 116 are at a corresponding first, or harvest position, and a larger size of the channel 124 that is associated with the auxiliary action moving the one or both deck plate(s) 114, 116 to another position. As previously mentioned, an initial or harvest position of one or both of the deck plates 114, 116 can, for example, be identified or recorded by information provided by one or more of the position sensors 336 or identified by an extent the deck plate 114, 116 is moved from the corresponding harvest position. Accordingly, at block 1310, the auxiliary action can include the controller 304, 306 generating a signal for operation of a driver that displaces at least one of the deck plates 114, 116 such that the size (e.g., width) of the channel 124 is increased to a size that can at least assist in, or reduce the potential of the deck plates 114, 116 interfering with, the removal of the blockage 300 from the header 104.

According to the illustrated corn header 104, while the combine harvester 100 is operating in the harvesting state, the driver 320 of the drive system 328 can be operated in the first, forward direction such that the gathering chains 112, stalk rolls 154, 156, and choppers are also rotatably displaced in their associated first, or forward, directions. However, operation of the driver 330 in the second, reverse direction can result in the gathering chains 112, stalk rolls 154, 156, and choppers being displaced in their corresponding second, reverse directions. Thus, when the drive system 328 of the illustrated corn header 104 is operated in reverse at block 1312, one or more of the gathering chains 112, stalk rolls 154, 156, and choppers are operated in a manner that can seek to push or otherwise direct the blockage 300 away from the header 104 in an attempt to release or clear the blockage 300 from the header 104, or associated components.

As mentioned above, the exemplary auxiliary action in the method 1300 can, for example, correspond to an adjustment of the size (e.g., width) of the channel 124 between the deck plates 114, 116. Accordingly, the return of components to the harvest state position by one or more signals generated by the controller 304, 306, as indicated at above-discussed block 1120 of the method 1100 can, with respect to corresponding block 1320 of the method 1300 shown in FIG. 13, relate to displacing one or both of the deck plates 114, 116 so that the size (e.g., width) of the channel 124 between the deck plates 114, 116 is returned to the size that corresponds to both of the deck plates 114, 116 being at their associated first, or harvest, positions. Again, the amount to displace the one or both of the deck plates 114, 116, or the identification of one or both of the deck plates 114, 116 reaching their corresponding harvest position, can be determined using previously identified or recorded position information, as provided, for example, by a position sensor 336, including the optical sensor 336, among other information.

Figure 14:
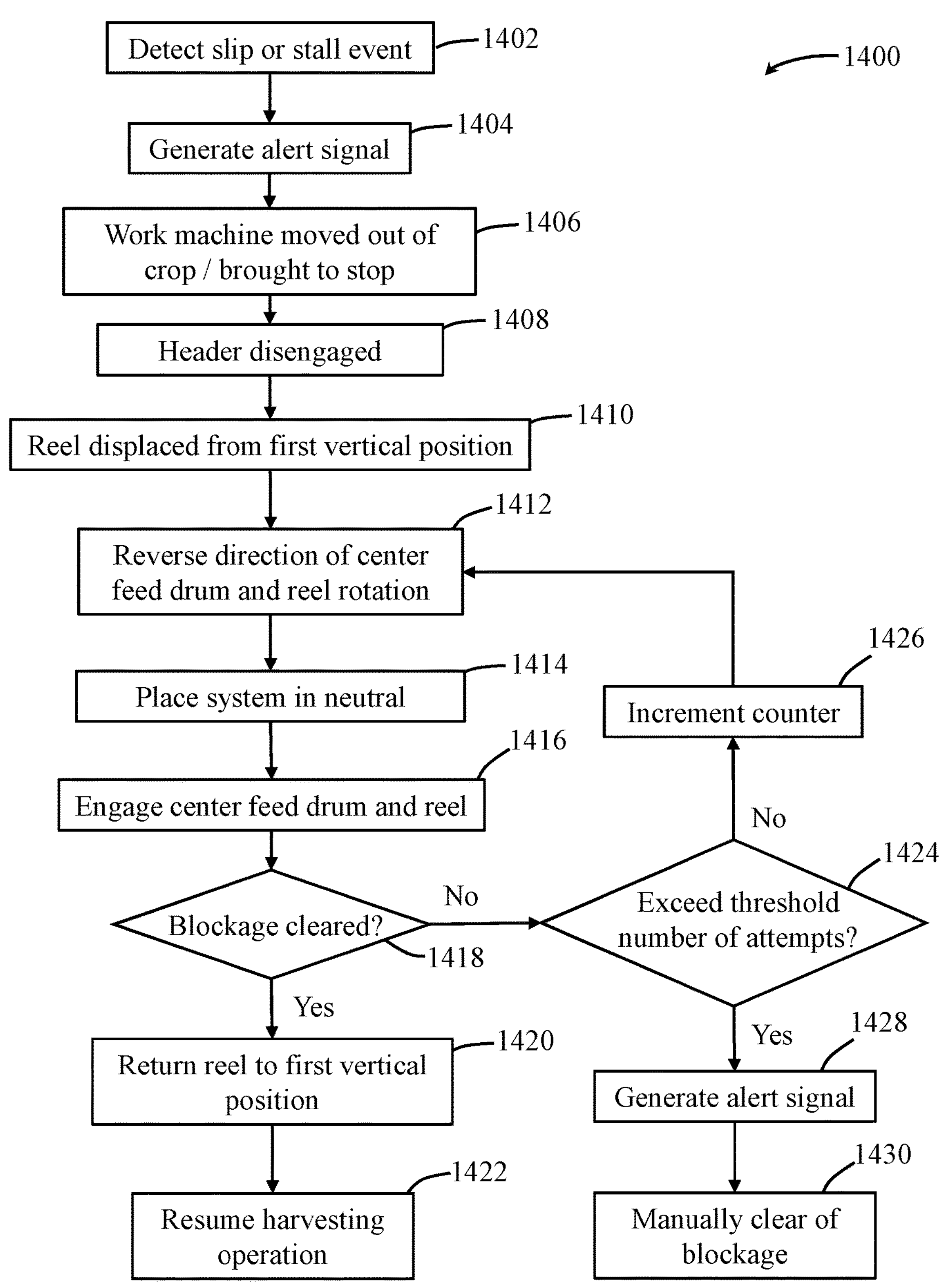
FIG. 14 illustrates a simplified flow diagram of an exemplary method for partially automated resolution of a header slip or stall event involving a draper belt header.

FIG. 14 illustrates a simplified flow diagram of an exemplary method 1400 for partially automated resolution of a header slip or stall event involving a draper belt header 204. The method 1400 is described below in the context of being carried out by the illustrated exemplary system 300. However, it should be appreciated that method 1400 can likewise be carried out by any of the other described implementations, as well as variations thereof. Further, the method 1400 corresponds to, or is otherwise associated with, performance of the blocks described below in the illustrative sequence of FIG. 14. It should be appreciated, however, that the method 1400 can be performed in one or more sequences different from the illustrative sequence. Additionally, one or more of the blocks mentioned below may not be performed, and the method 1400 can include steps or processes other than those discussed below.

The method 1400 depicted in FIG. 14 is generally similar to the method 1100 discussed above with respect to FIG. 11 but is more specifically directed to embodiments in which the header 204 is a draper belt header. Thus, the above disclosure relating to blocks 1102 through 1130 is generally applicable to each of the blocks 1402 through 1430, respectively, for the method 1400 illustrated in FIG. 14. However, with respect to the method 1400 depicted in FIG. 14, the detected slip or stall event at block 1402 can, at least in some instance, relate to a slippage of a slip clutch 302 that is utilized in connection with the transmission of power for rotation of the reel 206. However, in other instances, the slip or stall event can relate to a belt slip, including, for example, slippage of a conveyor belt of a side belt(s) 224 or the central belt conveyor 228, among other types of belt slips and slip events.

Additionally, block 1410 illustrates an example of a particular type of auxiliary action that could, for a draper belt header 204, also be performed as the auxiliary action at above-discussed blocks 1110, 1210, and 1228 for the methods 1100, 1200 illustrated in FIGS. 11 and 12. More specifically, with the drive system 328 disengaged (block 1408), at block 1410 the controller 304, 306 can issue one or more signals to facilitate vertical displacement of the reel 206 relative to the frame 210 of the header 204, such as, for example, via operation of the actuators 230, 232, as previously discussed. Additionally, or alternatively, the auxiliary action at block 1410 can involve actuation of actuators 234, 236 that can adjust the fore or aft position of the reel 206 relative to the frame 210. As mentioned above, such adjustments can involve moving the reel 206 away from a harvest position relative to at least the frame 210 of the header 204. Additionally, the corresponding harvest position, or the extent of the associated displacement from the harvest position, can be identified and recorded using at least information from one or more sensors 334, 336 such that the controller 304, 306 has information that can later be used, at block 1420, to return the reel 206 to the harvest position. Such a return of components to their harvest position at block 1420 can also include the return of the header 104, 204 to a position at which the header 104, 204 is, or will be upon travel of the combine harvester 100, 200 in the forward direction of travel 105, within crop material that is to be harvested.

With respect to reversal of the drive system 328, as identified at block 1412 for the illustrated method 1400, the draper belt header 204 is configured such that such reversal of the drive system 328 can result in the reel 206 rotating in a direction that is opposite of the direction of rotation of the reel 206 as the combine harvester 200 is operating while harvesting crop material. The nature of the action taken to facilitate a reversal in direction of displacement of one or more components of the drive system 328 can depend on a variety of criteria, including, for example, whether displacement is driven by a mechanical or hydraulic system. For example, with respect to mechanical systems, such reversal in the direction of displacement can relate to a reversal in a direction of operation of the associated driver 332, while a reversal in a direction of operation for a hydraulic system can involve selective actuation of one or more valves. Further, such reversal of the drive system 328 can also result in a center feed drum of the header 204 that normally directs crop material directly to the feederhouse 214, as well as the conveyor belts of the side belts 224 and central belt conveyor 228, operating in directions that would direct the blockage 300 away from the feederhouse 214. Similarly, subsequent engagement of the drive system 328 at block 1416 can result in each of the reel 206, center feed drum, and belts of the side belts 224 and central belt conveyor 228 being displaced in a direction similar to the direction at which those components are displaced while the header 204 is harvesting crop material.

Figure 15:
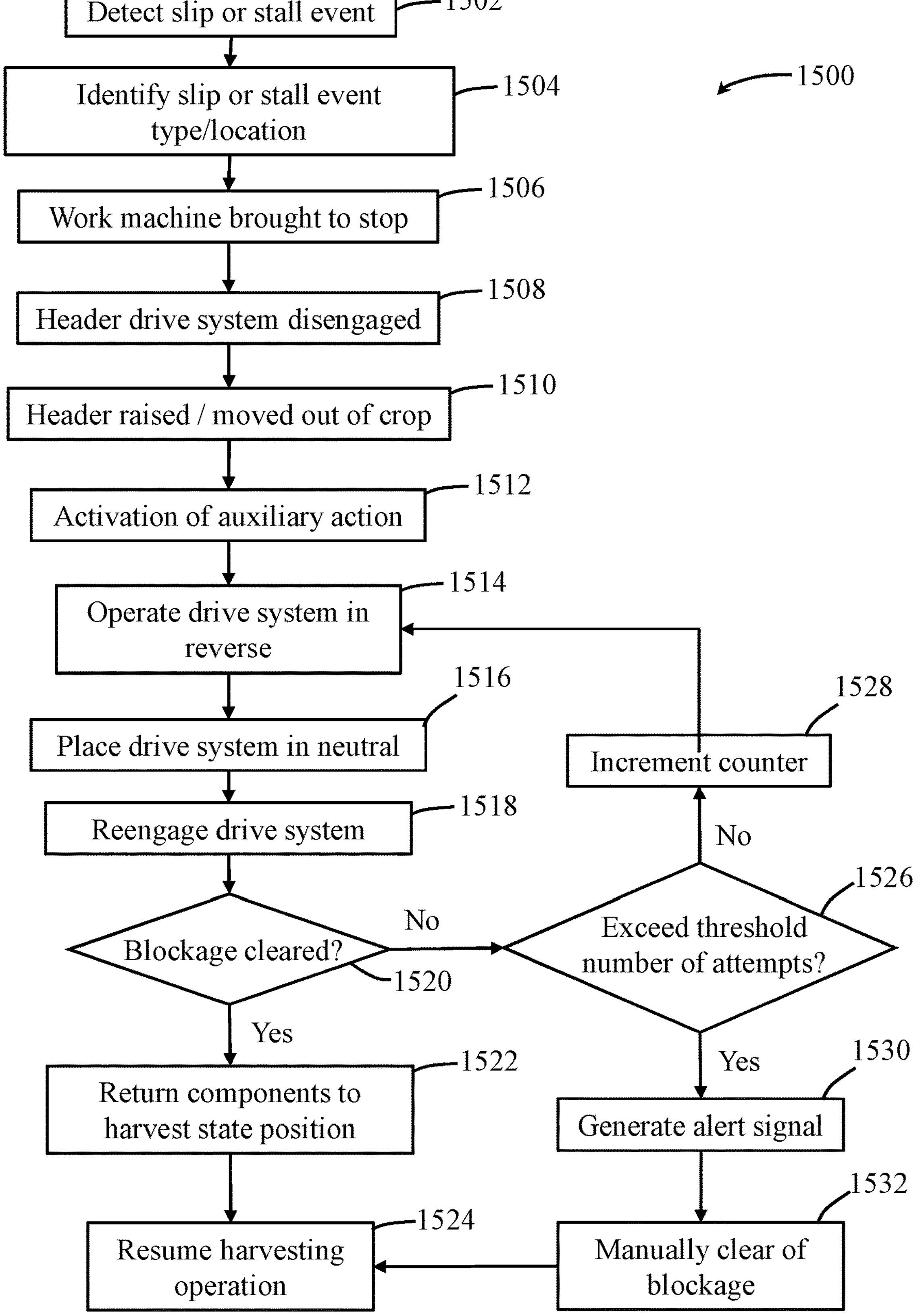
FIG. 15 illustrates a simplified flow diagram of an exemplary method for an automated resolution of a header slip or stall event.

FIG. 15 illustrates a simplified flow diagram of an exemplary method 1500 for automated resolution of a header slip or stall event. The method 1500 is described below in the context of being carried out by the illustrated exemplary system 300. However, it should be appreciated that method 1500 can likewise be carried out by any of the other described implementations, as well as variations thereof. Further, the method 1500 corresponds to, or is otherwise associated with, performance of the blocks described below in the illustrative sequence of FIG. 15. It should be appreciated, however, that the method 1500 can be performed in one or more sequences different from the illustrative sequence. Additionally, one or more of the blocks mentioned below may not be performed, and the method 1500 can include steps or processes other than those discussed below.

As seen above, the methods 1100, 1200, 1300, and 1400 can be viewed as partially automated in that certain actions are performed in response to the controller 304, 306 receiving a command or input from an operator of the combine harvester 100, 200. For example, in the preceding exemplary methods 1100, 1200, 1300, and 1400, following being alerted about the detection of the slip or stall event, the operator can, via use of the input device 316, provide one or more commands that can bring the combine harvester 100, 200 to a stop, including at a stop at a location at which either or both the header 104, 204 or combine harvester 1002, 200 is outside of the crop material that is being harvested. Further, the operator can issue one or more commands via use of the input device 316 to disengage the drive system 328. However, as seen below with respect to the methods 1500, 1600, 1700 illustrated by FIGS. 15, 16, and 17, respectively, other embodiments of the subject disclosure can be more automated. Moreover, as discussed below, according to certain embodiments, detection of a slip or stall event can automatically trigger the controller 304, 306 to issue commands that, for other embodiments, were provide by the operator.

Accordingly, as seen in FIG. 15, the occurrence of a slip or stall event can be detected at block 1502. As previously discussed, the occurrence of a slip or stall event can be detected in a variety of manners. For example, as discussed above, information from one or more sensors 324, which can include an optical sensor 334, can contain, or provide information that can be used to derive by the controller 304, 306, an indication that at least one slip clutch 302 has experienced a slippage, or a conveyor belt or other belt of the header 104, 204 is experiencing belt slippage.

According to certain embodiments, in response to a detection of the slip or stall event, the controller 304, 306 can, at block 1504, identify either, or both, the type of slip or stall event or location of the slip or stall event. For example, according to certain embodiments, the controller 304, 306 can utilize information provided by one or more sensors, including, for example, the sensor 324 or optical sensor 334, whether the slip or stall event relates to a slippage of a slip clutch 302 or belt slip. Additionally, according to certain embodiments, the sensor 324 can be at a location about the header 104, 204 that is associated with a particular type or location of slip event. For example, according to certain embodiments, the vibration profile provided by at least one sensor 324 can be predetermined to be associated with whether slip or stall events have occurred at row units 108 and involve slip clutches 302. Additionally, or alternatively, information captured by an optical sensor 334 can be analyzed by the controller 304, 306 to identify the location of the slip or stall event, as well as, with respect to slip events, whether a particular identified slip clutch 302 has been triggered, or whether identify if the belt of a side belt(s) 224 or the central belt conveyor 228 is experiencing belt slippage.

Additionally, in response to detection of the slip or stall event, the controller 304, 306 can, at block 1506, generate one or more commands for at least the transmission system 338 of the combine harvester 100, 200 that facilitates at least a temporary stoppage in travel of the combine harvester 100, 200, and in particular, movement in at least the first, forward direction 105.

Further, the controller 304, 306 can, at block 1508, generate a signal for a disengagement of the drive system 328 of the combine harvester 100, 200. Such disengagement of the drive system 328 at block 1508 can be similar to the disengagement discussed above with respect to at least block 1108 of the method 1100 illustrated in FIG. 11 and can thus result in stoppage of operation of the driven bodies 332. For example, according to certain embodiments, the controller 304, 306 can generate a signal that at least temporarily deactivates the driver 330, or otherwise facilitates a prevention of a transmission of power from the driver 330 to at least the driven bodies 332.

Additionally, at block 1510, the controller 304, 306 can generate one or more commands that facilitate the header 104, 204 being raised in a vertical direction relative to the adjacent ground so as to be moved out of the below adjacent crop material that is, or is to be, harvested. Additionally, according to certain embodiments, the controller 304, 306 can, at block 1510, generate one or more commands for at least the transmission system 338 of the combine harvester 100, 200 that facilitates movement of the combine harvester 100, 200 in the reverse direction of travel 107 such that the header 104, 204 is displaced away, or out of, the crop material.

Similar to block 1110, the controller 304, 306 can generate commands that can result in an auxiliary action occurring at block 1512. Again, the type of auxiliary action taken at block 1512 can depend on the type of header 104, 204, and can include, for example, one or more of the auxiliary actions discussed above with respect to at least blocks 1110, 1210, 1310, 1410 for methods 1100, 1200, 1300, 1400, respectively. Additionally, similar to block 1112 of the method 1100 shown in FIG. 11, the drive system 328 can then, at block 1514, be operated in a reverse direction such that the driven bodies 332 can also be displaced in associated reverse directions so as to attempt to drive a removal, or clearing, of the blockage 300 from the header 104, 204.

At block 1516, the controller 304, 306 can issue one or more commands to place the drive system 328 in neutral before the controller 304, 306 generates commands to have the drive system 328 subsequently reengaged at block 1518. Similar to block 1116 of the method 1100 discussed above with respect to FIG. 11, such reengagement of the drive system 328 at block 1518 can include the driver 330 being activated, or otherwise placing the drive system 328 in a condition in which power generated by operation of the driver 330 is transmitted to power operation, including movement, of one or more of the driven bodies 332. Additionally, such reengagement of the drive system 328 at block 1518 can include resuming operation of the driver 330 in the first, or forward, direction. Such operation of the driver 330 in the first, or forward, direction can result in at least some of the driven bodies 332 being displaced, such as rotated, in the same direction that the driven bodies 332 were operating while the combine harvester 100, 200 and associated header 104, 204 were operating in the harvesting state prior to the slip or stall event.

At block 1520, the controller 304, 306 can determine whether the blockage 300 has been cleared or otherwise removed from the header 104, 204. Such a determination at block 1520 can, according to certain embodiments, use information provided by one or more of the sensor 324, which can include the optical sensor 334, among other sensors, while the drive system 328 is reengaged, as discussed, for example, with respect to block 1118 of the method 1100 shown in FIG. 11.

Similar to blocks 1118 and 1120, as well as the discussion pertaining to block 1122 regarding an automatic return to operating in the harvesting state for the method 1100 illustrated in FIG. 11, if the controller 304, 306 determines at block 1520 that the blockage 300 has been cleared, then at block 1522, the positions of components of the header 104 that were adjusted in connection with the auxiliary actions can be returned to their corresponding harvest positions, and the combine harvester 100, 200 resume operating in the harvesting state at block 1524. Additionally, a return of components to their harvest position at block 1522 can also include the controller 304, 306 generating one or more signals that facilitates a return of the header 104, 204 to a position at which the header 104, 204 is, or will be upon travel of the combine harvester 100, 200 in the forward direction of travel 105, within crop material that is to be harvested.

However, similar to blocks 1118 and 1124 of the method 1100 shown in FIG. 11, if the outcome of the determination by the controller 304, 306 at block 1520 is the blockage 300 has not been cleared, then, at block 1526 the controller 304, 306 can determine whether the number of attempts to clear the blockage 300 has exceeded a threshold number of attempts. If the controller 304, 306 determines at block 1526 that the number of attempts to clear the blockage 300 has not yet exceeded the threshold number, then the counter can be incremented accordingly at block 1528 before a subsequent attempt is taken again at block 1514 to clear the blockage 300. If, however, the controller 304, 306 determines at block 1526 that the number of prior attempts to clear the blockage 300 has exceeded the threshold number of attempts, then at block 1530 the controller 304, 306 can generate an alert signal to communicate, via the output device 318 of the agricultural vehicle 100, 200 or of a mobile or handheld device or other device that can be remotely located from the combine harvester 100, 200, that the operator is to, at block 1532, resort to other manners for removal of the blockage 300. Such other manners for removal of the blockage 300 can include, for example, manually clearing the blockage 300 from the header 104, 204 at block 1532.

As seen in FIG. 15, once the blockage 300 is removed from the header 104, 204 at block 1532, resumption of operating the combine harvester 100, 200 in the harvesting state can resume at block 1524. Further, the method 1500 can continuously be implemented in response to detection of slip or stall events during the duration of the harvesting operation being performed by the combine harvester 100, 200.

Figure 16:
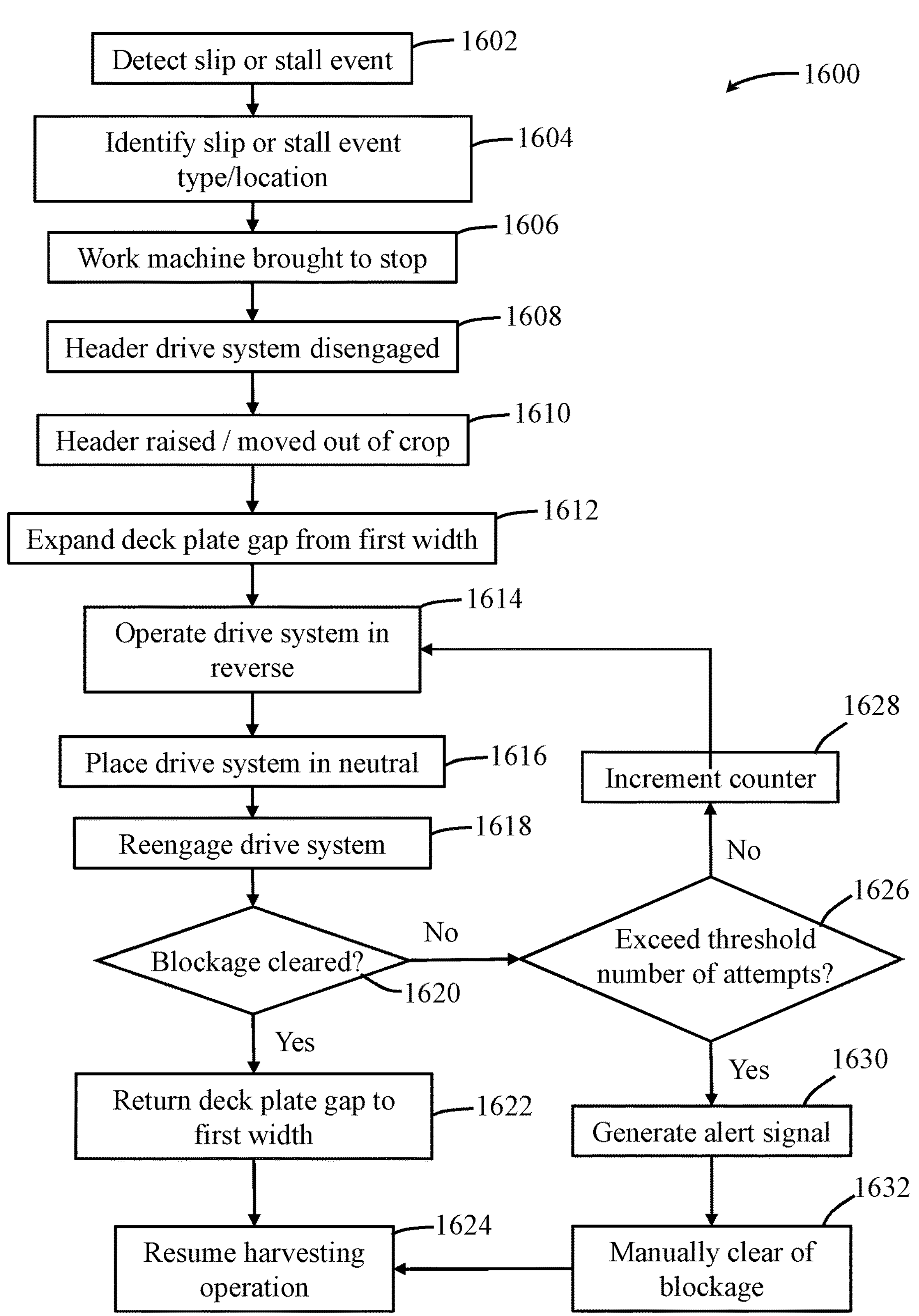
FIG. 16 illustrates a simplified flow diagram of an exemplary method for an automated resolution of a header slip or stall event involving a corn header.

FIG. 16 illustrates a simplified flow diagram of an exemplary method 1600 for automated resolution of a header slip or stall event involving a corn header 104. The method 1600 is described below in the context of being carried out by the illustrated exemplary system 300. However, it should be appreciated that method 1600 can likewise be carried out by any of the other described implementations, as well as variations thereof. Further, the method 1600 corresponds to, or is otherwise associated with, performance of the blocks described below in the illustrative sequence of FIG. 16. It should be appreciated, however, that the method 1600 can be performed in one or more sequences different from the illustrative sequence. Additionally, one or more of the blocks mentioned below may not be performed, and the method 1600 can include steps or processes other than those discussed below.

The method 1600 depicted in FIG. 16 is generally similar to the method 1500 discussed above with respect to FIG. 15 but is more specifically directed to embodiments in which the header 104 is a corn header. Thus, the above disclosure relating to blocks 1502 through 1532 for the method 1500 illustrated in FIG. 15 are generally applicable to each of the blocks 1602 through 1632, respectively, for the method 1600 illustrated in FIG. 16. Thus, with respect to the method 1600 depicted in FIG. 16, the detected slip or stall event at block 1602 can relate to, for example, a slippage of a slip clutch 302 that may, for example, be related to a blockage, such as, for example, a blockage 300 interfering with the operation of one or more row units 108 or choppers. For example, as previously discussed, such a trigger event can relate to a blockage 300 interfering with the rotational displacement of one or more gathering chains 112 or stock rolls 154, 156 or operation of a chopper.

Additionally, block 1612 illustrates an example of a particular type of auxiliary action that could, for a corn header 104, which can be similar to the auxiliary action discussed above with respect to at least block 1310 for the method 1300 illustrated in FIG. 13. More specifically, with the drive system 328 disengaged (block 1608), at block 1612 the controller 304, 306 can, for an auxiliary action, issue one or more signals to facilitate displacement of one or both of the deck plates 114, 116 so as to increase the size (e.g., width) of the channel 124 therebetween. Such an increase in the size of the channel 124 can relate to a change in the size of the channel 124 when one or both of the deck plates 114, 116 are at a corresponding first, or harvest position, and a larger size of the channel 124 that is associated with the auxiliary action moving the one or both deck plate(s) 114, 116 to another position. Such an increase in size of the channel 124, resulting from the auxiliary action, can at least assist in, or reduce the potential of the deck plates 114, 116 interfering with, the removal of the blockage 300 from the header 104.

Further, according to the illustrated corn header 104, while the combine harvester 100 is operating in the harvesting state, the driver 320 can be operated in the first, forward direction such that the gathering chains 112, stalk rolls 154, 156, and choppers can also be rotatably displaced in their associated first, or forward, directions. However, operation of the driver 330 in a second, reverse direction at block 1614 can result in the gathering chains 112, stalk rolls 154, 156, and choppers being displaced in their corresponding second, or reverse directions. Thus, when the drive system 328 of the illustrated corn header 104 is operated in reverse at block 1614, one or more of the gathering chains 112, stalk rolls 154, 156, and choppers are operated in a manner that can seek to push or otherwise direct the blockage 300 away from the header 104 in an attempt to release or clear the blockage 300 from the header 104, or associated components.

Similar to the methods 1100, 1300, and 1500 shown in FIGS. 11, 13, and 15, respectively, following placement of the drive system 328 in neutral (block 1616), reengagement of the drive system (block 1618), and a determination that the blockage 300 has been cleared (block 1620), the header 104, as well as components of the header 104 displaced by the auxiliary action at block 1612 can be returned to their harvest position. Such a return of the positions of header 104 and associated components of the header 104 can be facilitated by one or more commands that are automatically generated by the controller 304, 306.

Figure 17:
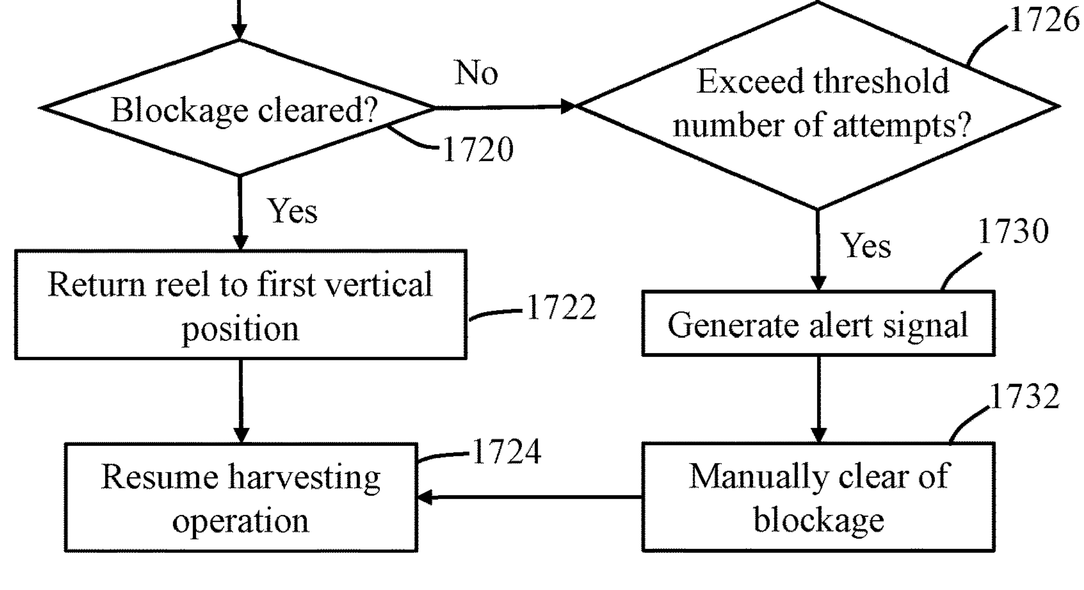
FIG. 17 illustrates a simplified flow diagram of an exemplary method for an automated resolution of header slip or stall event involving a draper belt header.

FIG. 17 illustrates a simplified flow diagram of an exemplary method 1700 for automated resolution of header slip or stall event involving a draper belt header. The method 1700 is described below in the context of being carried out by the illustrated exemplary system 300. However, it should be appreciated that method 1700 can likewise be carried out by any of the other described implementations, as well as variations thereof. Further, the method 1700 corresponds to, or is otherwise associated with, performance of the blocks described below in the illustrative sequence of FIG. 17. It should be appreciated, however, that the method 1700 can be performed in one or more sequences different from the illustrative sequence. Additionally, one or more of the blocks mentioned below may not be performed, and the method 1700 can include steps or processes other than those discussed below.

The method 1700 depicted in FIG. 17 is generally similar to the method 1500 discussed above with respect to FIG. 15 but is more specifically directed to embodiments in which the header 204 is a draper belt header. Thus, the above disclosure relating to blocks 1502 through 1532 for the method 1500 illustrated in FIG. 15 are generally applicable to each of the blocks 1702 through 1732, respectively, for the method 1700 illustrated in FIG. 17. Thus, with respect to the method 1700 depicted in FIG. 17, the detected slip or stall event at block 1702 can relate to a slippage of a slip clutch 302 that may, for example, be related to a blockage 300 interfering with the rotation of the reel 206, or a belt slip, including, for example, slippage of a conveyor belt of a side belt(s) 224 or central belt conveyor 228, among other types of slip or stall events.

Additionally, block 1712 illustrates an example of a particular type of auxiliary action that could, for a draper belt header 204, be performed as the auxiliary action. More specifically, with the drive system 328 disengaged (block 1708) and the header raised out of the crop material being, or to be, harvested (block 1710), at block 1712 the controller 304, 306 can issue one or more signals to facilitate vertical displacement of the reel 206 relative to the frame 210 of the header 204, such as, for example, via operation of the actuators 230, 232, as previously discussed. Additionally, or alternatively, the auxiliary action at block 1712 can involve actuation of actuators 234, 236 that can adjust the fore or aft position of the reel 206 relative to the frame 210. As also previously mentioned, such adjustments in the position of the reel 206 from a harvest position, or the extent of the associated displacement, being recorded by one or more sensors 334, 336 such that the controller 304, 306 has information that can later be used to return the reel 206 to the harvest position, such as, for example, at block 1722.

With respect to reversal of the drive system 328, as identified at block 1714 for the illustrated method 1700, the draper belt header 204 is configured such that such reversal of the drive system 328 can result in the reel 206 rotating in a direction that is opposite of the direction of rotation of the reel 206 as the combine harvester 200 is operating the harvesting mode. Further, such reversal of the drive system 328 can also involve the center feed drum of the header 204 that normally directs crop material directly to the feederhouse 214, as well as conveyor belts of the side belts 224 and central belt conveyor 228, operating directions that would direct crop material away from the feederhouse 214. Similarly, subsequent engagement of the drive system 328 at block 1718 can result in engagement of each of the reel 206, center feed drum, and belts of the side belts 224 and central belt conveyor 228 such that those components are displaced in a direction similar to the direction at which those components are displaced while the header 204 is operating in the harvesting state.

Similar to the methods 1100, 1400 and 1500 shown in FIGS. 11, 14 and 15, respectively, following reengagement of the drive system (block 1718), and a determination that the blockage 300 has been cleared (block 1720), the header 204, as well as components of the header 204 displaced by the auxiliary action at blocks 1710, 1712 can be returned to their harvest positions at block 1722. Such a return of the positions of header 204 and associated components of the header 204 can be facilitated by one or more commands that are automatically generated by the controller 304, 306. The combine harvester 200 can then resume the agricultural operation at block 1724.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for resolving a header slip or stall event for a header of a combine harvester, the system comprising:

a driver;

a driven body positioned about the header at a location to engage a crop material, the driven body coupled to the driver such that an operation of the driver facilitates selective displacement of the driven body relative to the header;

a sensor; and a memory device coupled with at least one processor, the memory device including instructions that, when executed by the at least one processor, cause the at least one processor to:

determine, from at least information provided by the sensor, an occurrence of the header slip or stall event that prevents a displacement of a driven body in a first direction;

generate an auxiliary action signal to perform an auxiliary action associated with a displacement of at least one component of the header from a harvest position;

generate, after performance of the auxiliary action, a first driver signal to operate the driver to facilitate a displacement of the driven body in either the first direction or a second direction, the second direction being opposite to the first direction;

determine, after generation of the first driver signal, whether a blockage is disengaged from the header; and generate, in response to the determination that the blockage is disengaged from the header, a component signal to facilitate a displacement of the at least one component of the header back to the harvest position.

2. The system of claim 1, wherein the memory device further includes instructions that, when executed by the at least one processor, cause the at least one processor to:

generate, after the determination of the occurrence of the header slip or stall event, a disengagement signal to cease a transmission of a power from the driver to the driven body;

generate, in response to the determination of the occurrence of the header slip or stall event, an alert signal to facilitate communication of an alert notification from an output device of the combine harvester; and receive, after communication of the alert notification and before disengagement or suspension of transmission of the power from the driver, an input signal transmitted from an input device of the combine harvester to move the header out the crop material that is to be harvested by the combine harvester.

3. The system of claim 1, wherein the memory device further includes instructions that, when executed by the at least one processor, cause the at least one processor to:

generate, in response to the determination of the occurrence of the header slip or stall event while the header is in a header harvest position, a displacement signal to facilitate a displacement of the header away from the header harvest position.

4. The system of claim 1, wherein the memory device further includes instructions that, when executed by the at least one processor, cause the at least one processor to:

determine, in response to the determination that the blockage is not disengaged from the header, whether a threshold number of attempts to remove the blockage from the header has been satisfied;

generate, in response to the determination that the threshold number of attempts has not been satisfied, a power signal to operate the driver to provide the power for an additional displacement of the driven body in the second direction.

5. The system of claim 4, wherein the memory device further includes instructions that, when executed by the at least one processor, cause the at least one processor to generate, in response to the determination that the threshold number of attempts has been satisfied, a communication signal to communicate an alert notification from an output device of the combine harvester.

6. The system of claim 1, wherein the header slip event is at least one of a slippage of a slip clutch or a belt slip.

7. The system of claim 1, wherein the driven body is at least one of a gathering chain, a stalk roll, a chopper, a reel, a conveyance belt, or a feed drum.

8. The system of claim 1, wherein the first driver signal, facilitates displacement of the driven body in the second direction, and wherein the memory device further includes instructions that, when executed by the at least one processor, cause the at least one processor to:

generate a second driver signal to operate the driver to facilitate, after the rotational displacement of the driven body in the second direction and prior to the determination of whether the blockage is disengaged from the header, a rotational displacement of the driven body in the first direction.

9. The system of claim 8, wherein the auxiliary action comprises an adjustment in a position of the reel in at least one of a vertical direction or a fore direction or an aft direction.

10. The system of claim 1, wherein the auxiliary action comprises displacing at least one of a first deck plate and a second deck plate to increase a size of a channel between the first deck plate and the second deck plate.

11. A method for resolving a header slip or stall event for a header of a combine harvester, the method comprising:

determining, from at least information provided by a sensor, an occurrence of the header slip or stall event that prevents a displacement of a driven body in a first direction, the driven body being selectively displaceable in the first direction or a second direction by a power transmitted from a driver, and wherein the driven body is positioned about the header at a location to engage a crop material;

generating an auxiliary action signal to perform an auxiliary action associated with a displacement of at least one component of the header from a harvest position to at least assist with a disengagement of a blockage from the header;

generating, after performance of the auxiliary action, a first driver signal to operate the driver to facilitate a displacement of the driven body in either the first direction or the second direction, the second direction being opposite to the first direction;

determining, after at least the generating of the first driver signal, whether the blockage is disengaged from the header; and generating, in response to determining the blockage is disengaged from the header, a component signal to facilitate a displacement of the at least one component of the header back to the harvest position.

12. The method of claim 11, further comprising:

generating, in response to the determining of the occurrence of the header slip or stall event, an alert signal that is communicated by an output device of the combine harvester; and receiving, following communication of the alert signal, an input signal transmitted from an input device of the combine harvester to move the header out the crop material that is to be harvested by the combine harvester.

13. The method of claim 11, further comprising:

generating, in response to the determining the occurrence of the header slip or stall event while the header is in a header harvest position, a displacement signal to facilitate a displacement of the header away from the header harvest position.

14. The method of claim 11, further comprising:

determining, in response to determining the blockage is not disengaged from the header, whether a threshold number of attempts to remove the blockage from the header has been satisfied;

generating, in response to determining that the threshold number of attempts has not been satisfied, a power signal to operate the driver to facilitate an additional displacement of the driven body in the second direction.

15. The method of claim 14, further comprising:

generating, in response to determining that the threshold number of attempts has been satisfied, an alert signal to be communicated via an output device of the combine harvester.

16. The method of claim 11, wherein determining the occurrence of the header slip event comprises determining an occurrence of at least one of a slippage of a slip clutch, a belt slip, or a stall associated with an opening of a pressure release valve.

17. The method of claim 11, wherein generating, after performance of the auxiliary action, the first driver facilitates displacement of the driven body in the second direction, the second direction being opposite to the first direction, and further comprising:

generating a second driver signal, after displacement of the driven body in the second direction and before determining whether the blockage is disengaged from the header, to facilitate a rotational displacement of the driven body in the first direction.

18. The method of claim 11, further comprising generating, after the determining of the occurrence of the header slip or stall event, a disengagement signal to cease a transmission of the power from the driver to the driven body.

19. The method of claim 18, wherein generating the auxiliary action signal comprises generating a signal that facilitates an adjustment in a position of the reel in at least one of a vertical direction or a fore direction or an aft direction.

20. The method of claim 11, wherein generating the auxiliary action signal comprises generating a signal to displace at least one of a first deck plate and a second deck plate to increase a size of a channel between the first deck plate and the second deck plate.

* * * * *